United States Patent
Snyder et al.

(10) Patent No.: US 11,285,756 B2
(45) Date of Patent: Mar. 29, 2022

(54) COMPOSITE WHEEL ASSEMBLY AND METHOD OF MANUFACTURING

(71) Applicant: Lacks Enterprises, Inc., Grand Rapids, MI (US)

(72) Inventors: Colin Snyder, Grand Rapids, MI (US); Rawley Stanhope, Middleville, MI (US)

(73) Assignee: Lacks Enterprises, Inc., Grand Rapids, MI (US)

( * ) Notice: Subject to any disclaimer, the term of this patent is extended or adjusted under 35 U.S.C. 154(b) by 435 days.

(21) Appl. No.: 16/272,666

(22) Filed: Feb. 11, 2019

(65) Prior Publication Data

US 2019/0248175 A1 Aug. 15, 2019

Related U.S. Application Data

(60) Provisional application No. 62/628,440, filed on Feb. 9, 2018.

(51) Int. Cl.
| | |
|---|---|
| *B60B 3/04* | (2006.01) |
| *B29B 11/14* | (2006.01) |
| *B60B 21/10* | (2006.01) |
| *B60B 3/08* | (2006.01) |
| *B29B 11/04* | (2006.01) |

(Continued)

(52) U.S. Cl.
CPC .............. *B60B 3/042* (2013.01); *B29B 11/04* (2013.01); *B29B 11/14* (2013.01); *B29C 65/002* (2013.01); *B29C 70/42* (2013.01); *B29C 70/685* (2013.01); *B60B 3/045* (2013.01); *B60B 3/08* (2013.01);
(Continued)

(58) Field of Classification Search
CPC ......... B29B 11/14; B29B 11/04; B60B 3/041; B60B 3/042; B60B 3/044; B60B 3/045; B60B 5/02; B60B 21/023; B60B 21/026; B60B 21/10; B60B 23/06; B60B 23/10
See application file for complete search history.

(56) References Cited

U.S. PATENT DOCUMENTS

| | | | |
|---|---|---|---|
| 4,294,639 A | 10/1981 | Woelfel et al. | |
| 4,636,344 A | 1/1987 | McDougall | |

(Continued)

FOREIGN PATENT DOCUMENTS

| | | | | |
|---|---|---|---|---|
| DE | 102018128331 B3 * | 8/2019 | ............. | B60B 23/08 |
| EP | 3284615 A1 * | 2/2018 | ............... | B60B 5/02 |

*Primary Examiner* — Jason R Bellinger
(74) *Attorney, Agent, or Firm* — Dickinson Wright, PLLC

(57) ABSTRACT

A composite wheel assembly and method of fabricating the same is provided. The wheel assembly includes a composite wheel rim, a wheel center, and a plurality of attachment fasteners for attaching the wheel center to the wheel rim. The wheel rim includes a plurality of attachment inserts that are configured to selectively engage with respective attachment fasteners. Each attachment insert is encapsulated by a plurality of composite layers of the wheel rim or is otherwise secured to the wheel rim. The attachment inserts extend from and/or are positioned within a drop well region of the wheel rim. The method of fabricating the wheel assembly includes forming first and second preforms and positioning the same onto a mold assembly. The method further includes positioning the attachment inserts between the first and second preforms such that the attachment inserts are secured therebetween.

27 Claims, 14 Drawing Sheets

(51) Int. Cl.
    *B60B 23/10*     (2006.01)
    *B60B 5/02*     (2006.01)
    *B29C 70/68*     (2006.01)
    *B29C 65/00*     (2006.01)
    *B29C 70/42*     (2006.01)

(52) U.S. Cl.
    CPC ............... *B60B 5/02* (2013.01); *B60B 21/10* (2013.01); *B60B 23/10* (2013.01)

(56) References Cited

U.S. PATENT DOCUMENTS

| | | | |
|---|---|---|---|
| 5,275,471 A * | 1/1994 | Nutzmann | B60B 23/10 301/10.1 |
| 9,676,229 B2 * | 6/2017 | Braunschweiler | B60B 1/14 |
| 10,414,206 B2 * | 9/2019 | Renner | B60B 5/02 |
| 10,773,545 B2 * | 9/2020 | Werner | B60B 23/06 |
| 2004/0145091 A1 | 7/2004 | Willig et al. | |
| 2014/0333122 A1 | 11/2014 | Werner et al. | |
| 2015/0273934 A1 * | 10/2015 | Huidekoper | B60B 23/10 301/11.1 |
| 2015/0352897 A1 * | 12/2015 | Huidekoper | B60B 23/08 301/11.1 |
| 2017/0050392 A1 | 2/2017 | Werner et al. | |
| 2017/0087929 A1 * | 3/2017 | Walls-Bruck | B60B 5/02 |
| 2019/0248043 A1 * | 8/2019 | Snyder | B29C 70/32 |

\* cited by examiner

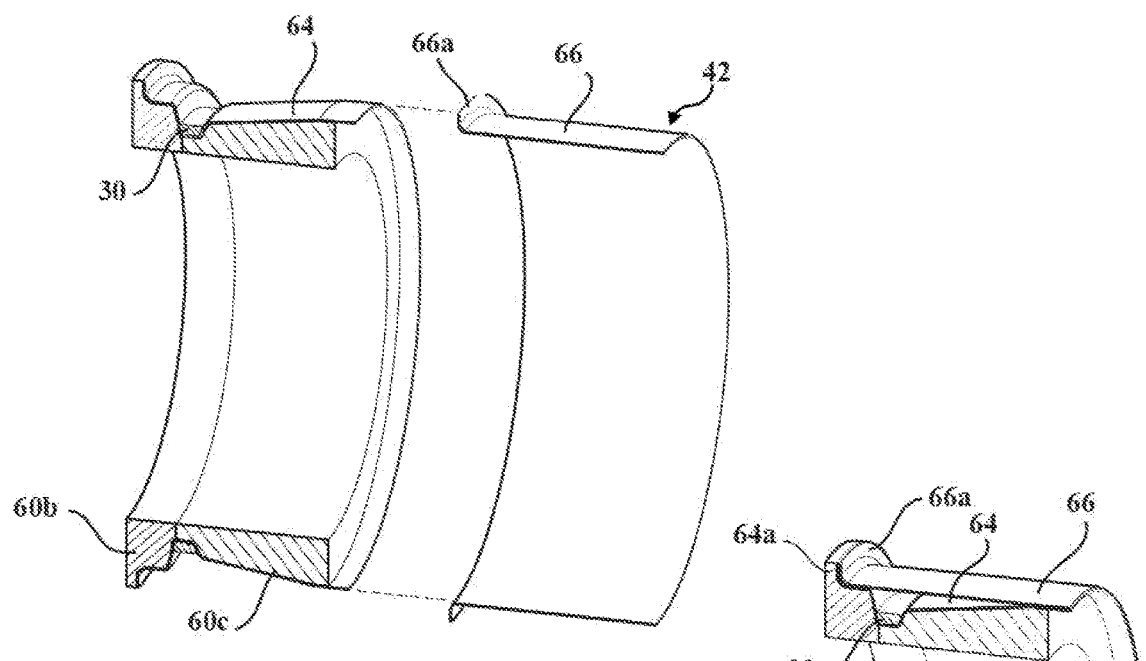
FIG. 17
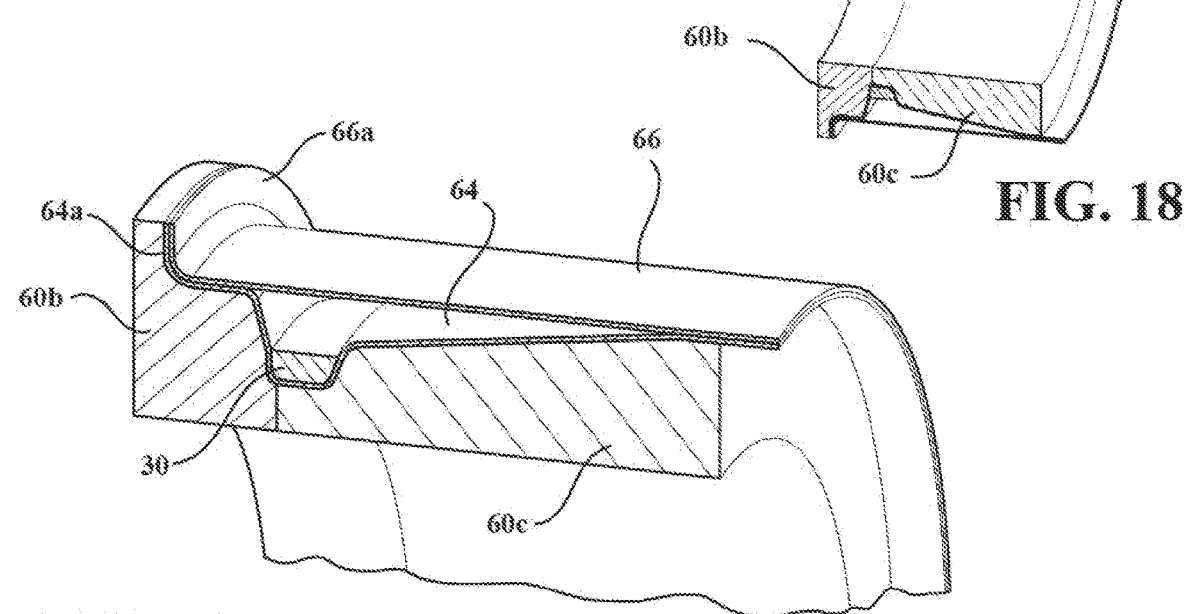
FIG. 18
FIG. 18A

COMPOSITE WHEEL ASSEMBLY AND METHOD OF MANUFACTURING

CROSS-REFERENCE TO RELATED APPLICATIONS

The present application claims priority to U.S. Provisional Patent Application Ser. No. 62/628,440, entitled "Composite Wheel Assembly", which was filed on Feb. 9, 2018 and which is hereby incorporated by reference.

FIELD OF THE INVENTION

The present disclosure relates generally to composite structures and related attachment systems and methods. More specifically, the present disclosure is concerned with a wheel assembly having a composite wheel rim and a wheel center selectively attached thereto.

BACKGROUND OF THE INVENTION

Wheel structures, and in particular automotive wheel structures, are in common use. A traditional automotive wheel includes a wheel rim portion and a wheel center portion. The wheel rim portion is the portion of the wheel that is disposed radially outward, and includes an axially inner and outer rim portion to which a traditional inflatable tire is secured. A rim body portion extends axially between the inner and outer rim portions.

The wheel center portion is the portion of the wheel that extends radially outward from the axial and rotational center of the wheel, and is typically disposed at an axially outer location of the wheel, and provides a mounting pattern to attach the wheel to corresponding bolts, lugs, studs, or the like that are coupled to the drive axle.

Various wheel constructions are known, including steel wheels, aluminum/alloy wheels, or composite wheels. Steel wheels are heavier than aluminum wheels, but are stronger than aluminum wheels. Aluminum wheel, while being lighter weight, are softer and more susceptible to bending.

Composite wheels and other composite structures provide several benefits over traditional materials. For instance, composite wheels provide relatively high strength, corrosion resistance, and durability at a relatively low weight. As such, composite wheels have become increasingly popular. As composite wheels continue to grow in popularity, users continue to desire new ways to enhance or otherwise change the appearance of such wheels by installing specialized and/or different wheel centers or other features on to the wheel rim.

Consequently, it would be beneficial to have a composite wheel assembly that is configured to allow a user to selectively change one or more of the wheel center or other feature of the wheel assembly. Furthermore, it would be beneficial if the wheel rim included a robust attachment feature for ensuring a secure attachment of such wheel center and/or other feature to such wheel rim. Furthermore still, it would be beneficial to have a method and/or process for fabricating a wheel rim having such features and/or capabilities.

SUMMARY OF THE DISCLOSURE

It is an aspect of the present disclosure to provide a composite wheel with a removable wheel center.

It is a further aspect of the present disclosure to provide a composite wheel with a strong attachment interface for a removable component.

It is a further aspect of the present disclosure to provide a method for manufacturing a composite wheel rim that enables the inclusion of an attachment interface for securing removable components.

In view of the above and the other aspects, a composite wheel assembly is provided that includes a composite wheel rim having a radially inner surface and a radially outer surface. A plurality of attachment inserts are disposed radially between the radially inner surface and the radially outer surface of the wheel rim. A wheel center is attached to the composite wheel rim via at least one fastener, wherein the fastener engages at least a portion of the attachment insert.

In another aspect, a method of forming a wheel assembly is provided, the method includes providing a mold for a wheel, the mold including an axially inner end, an axially outer end, and a radially outer surface. The mold can include a drop well region having an outer diameter that is reduced relative to the radially outer surface.

The method can include advancing a first layer of material over the radially outer surface and the drop well region and inserting the first layer of material inward into the drop well region. The method can further include placing an attachment insert into the drop well region over the first layer of material.

The method further includes advancing a second layer of material over the first layer of material and the attachment insert. Additionally, the method includes curing the first and second layers of material to form a wheel rim, and retaining the attachment insert between the first and second layers of material.

In yet another aspect, a composite wheel apparatus is provided, including a composite wheel rim having a radially inner surface and a radially outer surface extending between an axially inner end and an axially outer end. A first layer of composite material defines the radially inner surface, and a second layer of composite material defines the radially outer surface.

A plurality of attachment inserts may be spaced apart circumferentially and disposed radially between the first layer of material and the second layer of material. The inserts are disposed axially closer to the axially outer end than the axially inner end. The inserts are configured to support a wheel center attached to the composite wheel rim.

In yet another aspect, a method of forming a wheel rim is provided. The method includes providing a mold for a wheel, wherein the mold has a shape and includes an axially inner end an axially outer end and a radially outer surface. The method further includes providing a first tube preform of composite material and advancing the tube preform axially over the mold. The method further includes draping the tube preform against the radially outer surface of the mold; and shaping the tube preform to match the shape of the mold.

In yet another aspect, a wheel assembly is provided. The assembly includes a composite wheel rim having a radially outer surface and a radially inner surface, and a plurality of circumferentially disposed inserts disposed radially between a first ply stack and a second ply stack, wherein the first ply stack is disposed radially inward relative to the second ply stack. Each of the inserts includes a bore extending therethrough, wherein an axis of the bore enters and exits a radially outer volume defined by the first play stack.

In yet another aspect, a method of producing a wheel preform is provided. The method includes creating a substantially straight wall tube preform having one or more layers of composite material, providing a contoured mold for a wheel rim, advanced the tube preform over at least a portion of the contoured mold, and draping the tube preform to a contoured shape on the contoured mold.

BRIEF DESCRIPTION OF THE DRAWINGS

A preferred aspect of the disclosure, illustrative of the best mode in which the applicant has contemplated applying the principles, is set forth in the following description and is shown in the drawings and is particularly and distinctly pointed out and set forth in the appended claims.

FIG. 9 is a sectional perspective view of a mold assembly of the present disclosure, the mold assembly having opposed inner and outer portions and a center portion extending there between.

FIG. 17 is a sectional perspective view of a second tube preform aligned with the stack-up of FIG. 15, the second tube preform being in a second configuration, similar to the second configuration of the first tube preform as shown in FIG. 11.

FIG. 18 is a sectional view of the second tube preform being positioned on the stack-up of FIG. 15.

FIG. 18A is detail view of the stack-up of FIG. 18 shown on an enlarged scale.

DETAILED DESCRIPTION OF THE PREFERRED EMBODIMENT

With reference to FIGS. 1-3B, a system 10 may include a wheel assembly 12 having a wheel rim 14 and a wheel center 16. The wheel rim 14 may be in the form of a composite wheel rim formed from one or more preforms, which are further described below. Each preform may include one or more layer of material, such as one or more layer of elongated fibers and/or polymer or non-polymer materials. As used herein, the term "layer" refers to a stack or a ply stack, which may be one or more layers of material. It will be appreciated that unless otherwise noted, reference to a layer shall not be interpreted as only one layer of material. For example, many layers of material could be included as part of a stack or ply stack, which combine to form the overall layer. The wheel center 16 may be selectively attached and detached from the wheel rim 14, such that the wheel center 16 may be replaced with another type of wheel center 16 having a different appearance or different features to suit the particular needs of the user.

Figure 1:
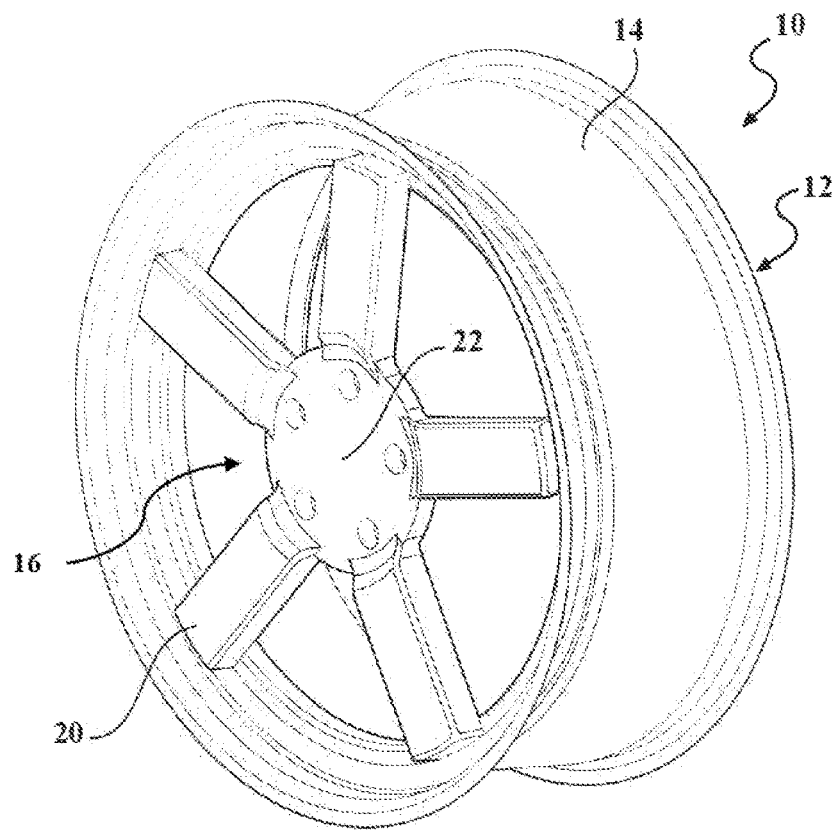
FIG. 1 is a perspective view of a wheel assembly according to an aspect of the disclosure, the wheel assembly having a wheel rim and a wheel center attached thereto.
Figure 2:
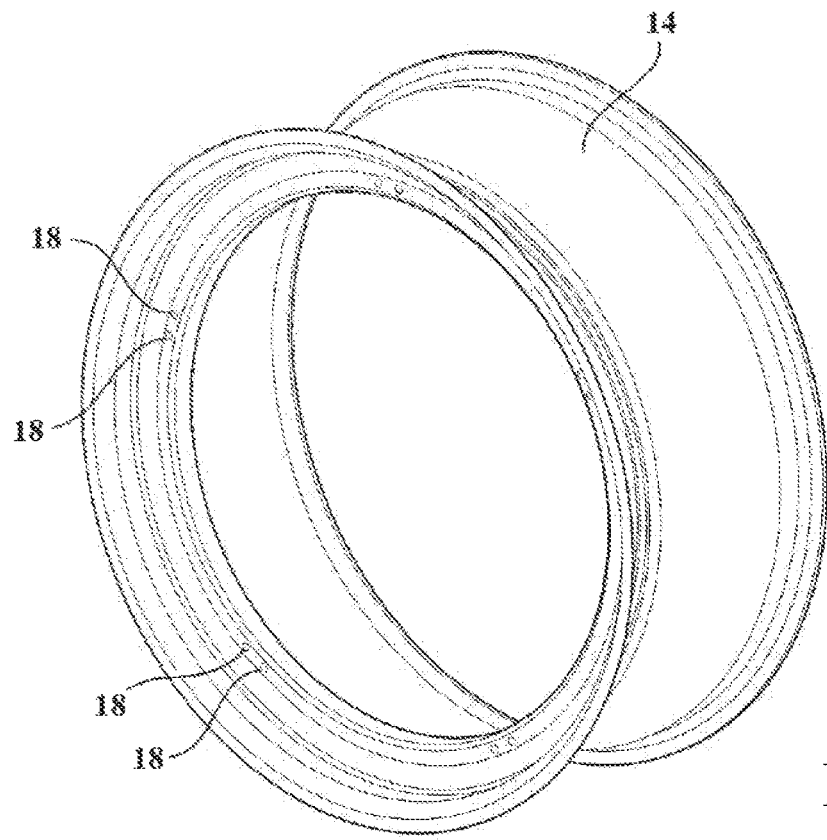
FIG. 2 is a perspective view of the wheel rim of FIG. 1.

FIG. 1 illustrates the wheel rim 14 and the wheel center 16 attached to each other to define the overall wheel 12. FIG. 2 illustrates the wheel center 16 removed from the wheel rim 14, thereby allowing for the wheel center 16 to be replaced or reinstalled on the wheel rim 14

As shown in FIG. 2, the wheel rim 14 may define a plurality of radially and circumferentially spaced apertures 18 extending axially through one or more layer of the wheel rim 14. The apertures 18 are shown in FIG. 2 as being arranged in spaced apart pairs, with five pairs being shown generally evenly spaced about the circumference of the wheel rim 14. However, the apertures may be arranged in a variety of other suitable ways.

FIG. 1 illustrates the wheel center 16 with five spokes 20 that are evenly spaced and radiating from a hub portion 22 of the wheel center 16. The spokes 20 may be arranged and spaced to correspond to the pairs of the apertures 18 disposed about the wheel rim 14. In the illustration of FIGS. 1 and 2, the five spokes 20 correspond to the five pairs of apertures 18. However, it will be appreciated that a different number of spokes 20 and apertures 18 could also be used such that the wheel center 16 may be securely attached to the wheel rim 14. The number and arrangement of spokes 20 need not match the number of pairs or groups of apertures 18. For example, some apertures 18 may go unused. Moreover, the apertures 18 need not be arranged in pairs. For example, one aperture 18 may be used to attach one spoke 20, or three apertures 18 may be used to attach one spoke. In the case of a group of apertures 18, the apertures 18 need not have the same radial distance from the axial center of the wheel 12. For example, multiple apertures 18 may be arranged at different radial distances. Moreover, multiple apertures may be disposed in the same radial direction and spaced apart at different radial distances. It will be appreciated that various other combinations and spacing of the apertures 18 on the wheel rim 14 are contemplated.

With regard to the wheel center 16, it will be appreciated that the wheel center 16 need not be in the hub-and-spoke arrangement shown in FIG. 1. In another aspect, the wheel center 16 may be in the form of a disc. In the case of the spokes 20, the spokes 20 may be unevenly spaced. It will be appreciated that various shapes of the wheel center 16 are contemplated.

Figure 3A:
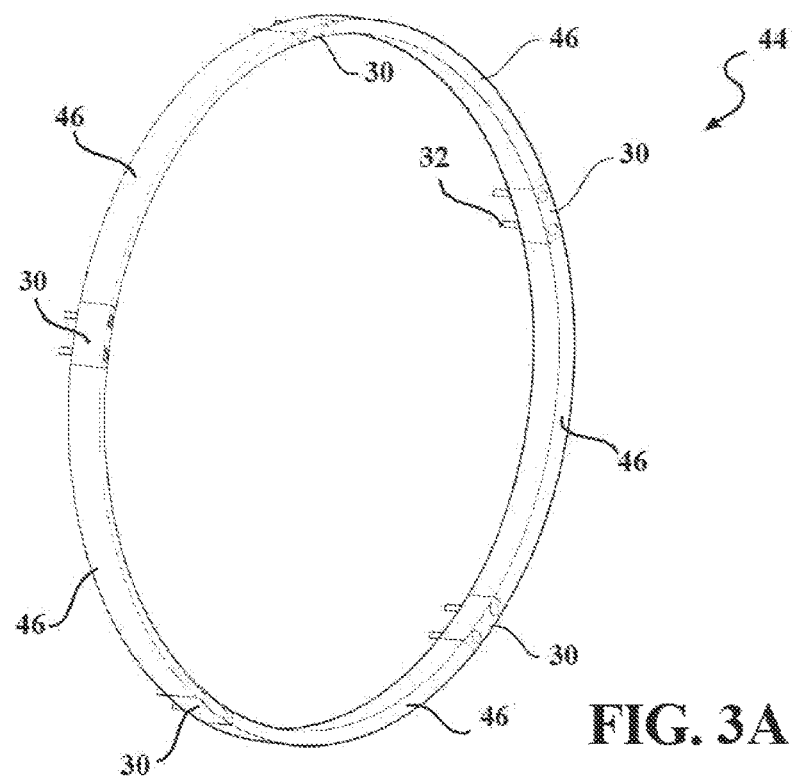
FIG. 3A is a perspective view of a plurality of inserts and corresponding spacers associated with certain aspects of the wheel rim of FIG. 2, FIG. 3A further showing fasteners extending from each insert.
Figure 3B:
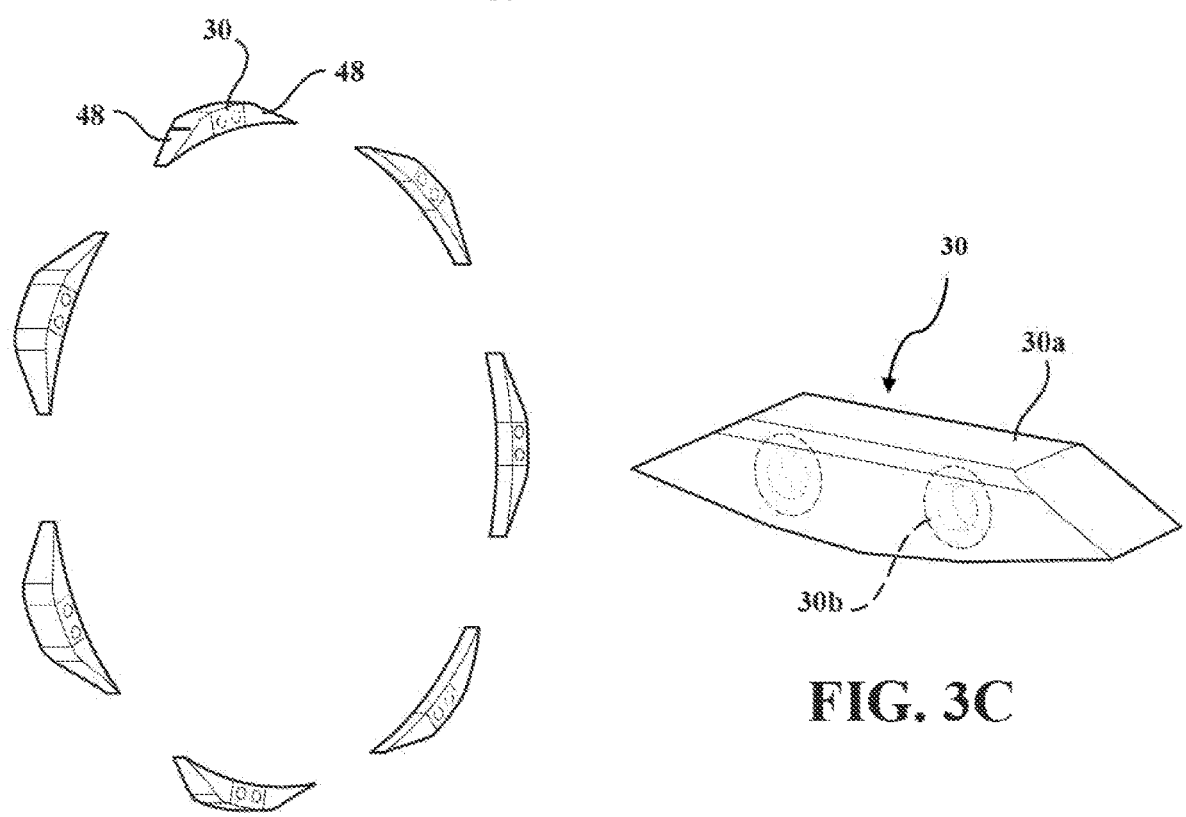
FIG. 3B is a perspective view of a plurality of inserts associated with certain embodiments of the wheel rim of FIG. 2.
Figure 3C:
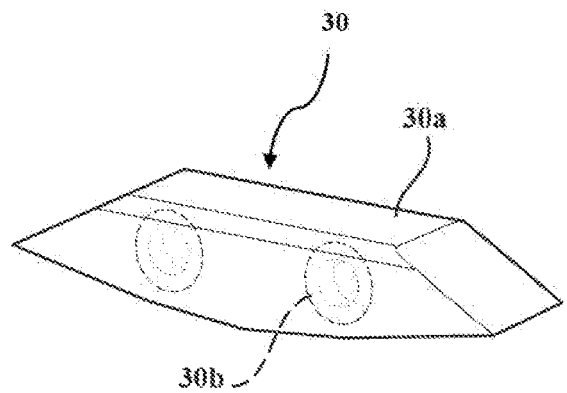
FIG. 3C is a perspective view of a multi-material insert.

With reference to FIGS. 3A-3C, in one aspect, the wheel rim 14 may include a plurality of circumferentially spaced attachment inserts 30 for providing selective attachment points for attaching the wheel center 16 to the wheel rim 14. Each attachment insert 30 may be aligned with one or more attachment aperture 18 and may be configured to receive one or more fasteners 32 (such as a bolt or stud, more clearly shown in FIGS. 7 and 8) for selectively securing the wheel center 16 to the wheel rim 14. It will be appreciated that other objects may also be attached to the wheel rim 14 via the apertures 18 and inserts 30.

Figure 7:
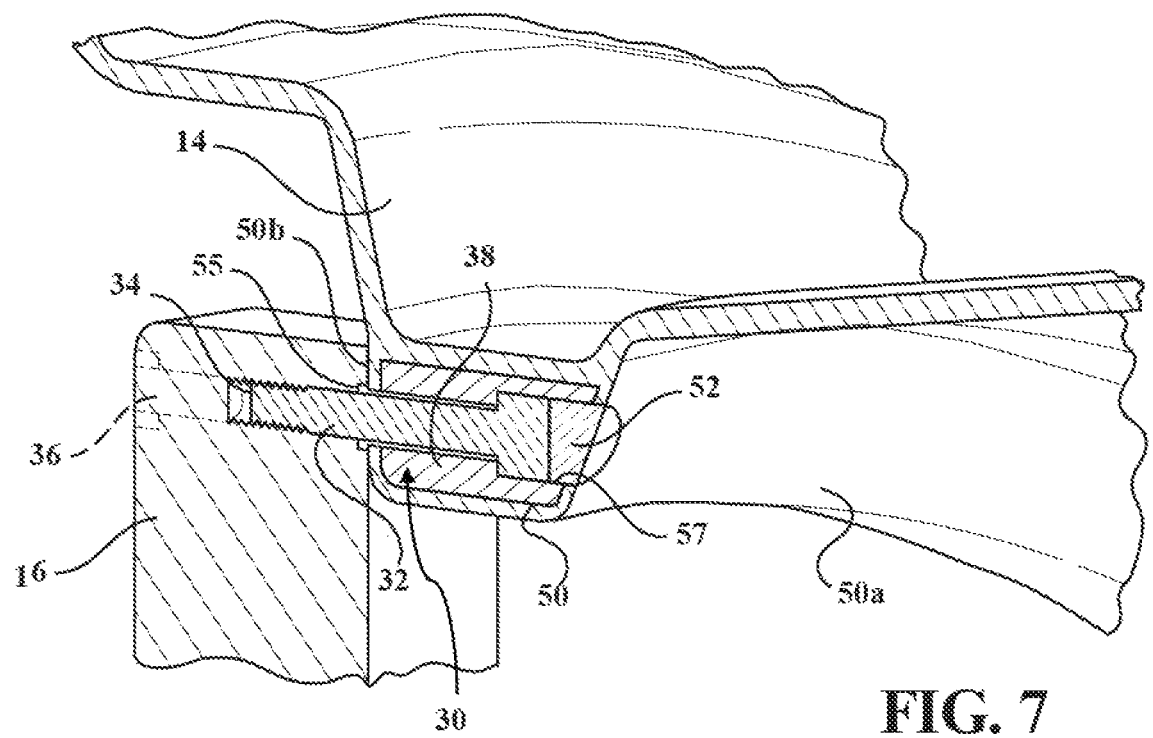
FIG. 7 is a sectional view of FIG. 6 showing a sectional view of a fastener extending through the fastener hole of the first insert, the fastener shown engaged with a sectional view of the wheel center of FIG. 1.
Figure 8:
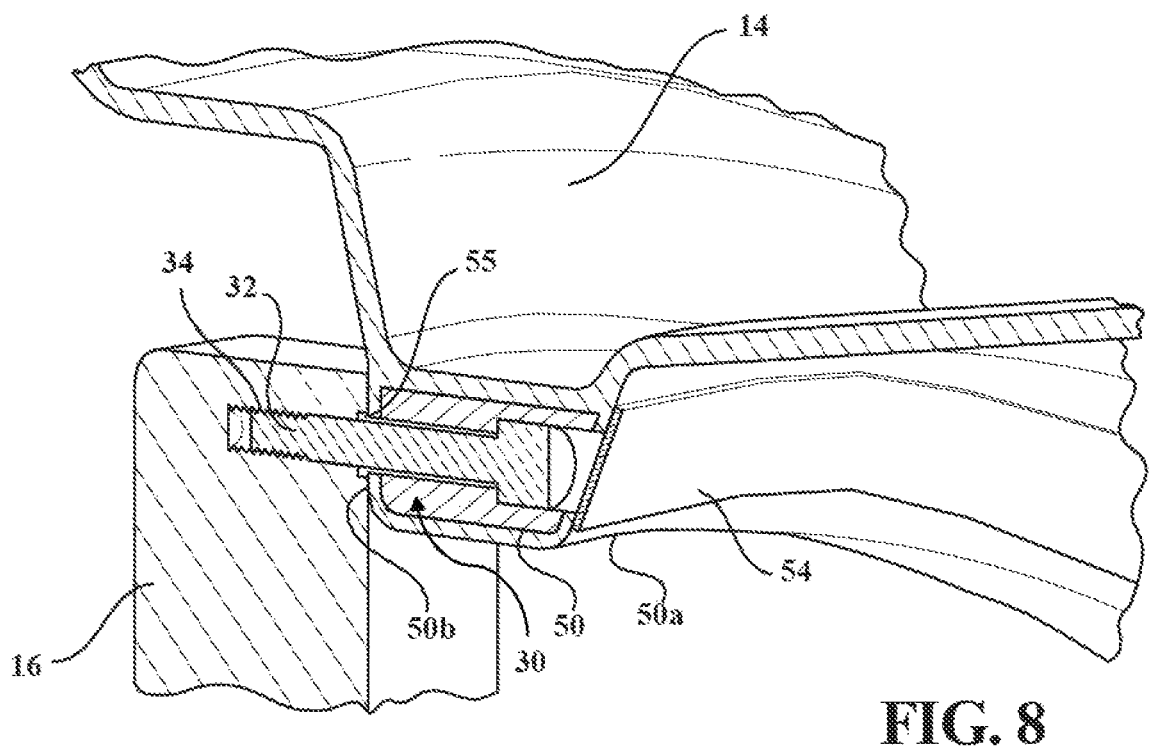
FIG. 8 is the sectional view of FIG. 7 showing an inboard seal plate extending over an inboard opening of the fastener hole of the first insert.

In one aspect, shown in FIGS. 7 and 8, the wheel center 16 may define internal threads 34 that are configured to selectively engage with a threaded region of a respective attachment fastener 32, thereby allowing the wheel center 16 to be attached to the wheel rim 14 by extending the attachment fasteners 32 into engagement with respective threads 34 of the wheel center 16. In this approach, the fasteners 32 may be passed from the inner side of the wheel rim 14 and toward the outer side, thereby engaging the wheel center 16 that is placed on the outer side of the wheel rim 14.

In another aspect, the wheel center 16 may define a plurality of through holes 36 (FIG. 7), similarly disposed about the wheel center 16 like the threads 34 described above, such that the wheel center 16 can be attached to the wheel rim 14 by extending a plurality of attachment fasteners 32 through respective through holes 36 of the wheel center 16. In this approach, the fasteners 32 may be passed through the wheel rim 14 and the wheel center 16 from either direction. The wheel center 16 may include a counterbore at the location of the holes 36 to receive the head of the fastener 32, if desired.

In one aspect, a plurality of secondary fasteners (not shown), such as nuts, clips, or the like, may be included and configured to secure to respective attachment fasteners 32 that extend through the holes 36, thereby securing the wheel center 16 to the wheel rim 14. In some aspects, one or more secondary fasteners may be secured to or otherwise engaged with the wheel center 16 and/or the wheel rim 14 independent of its engagement with a respective attachment fastener.

In yet another aspect, the attachment fasteners 32 may extend from the wheel center 16 into respective attachment inserts 30. In this approach, the attachment insert 30 may define a threaded section 38 having corresponding threads (not explicitly shown) for selective engagement with respective threaded regions of the attachment fasteners 32. In another approach, the attachment inserts 30 may be configured to allow selective engagement of each attachment fastener with one or more respective secondary fasteners.

Figure 4:
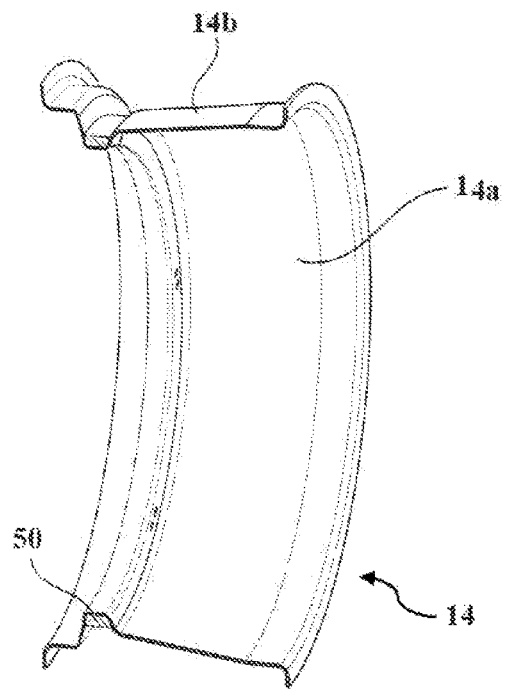
FIG. 4 is a sectional view of the wheel rim of FIG. 2, the cut taken through a center of a first insert positioned in an upper region of the wheel rim.
Figure 5:
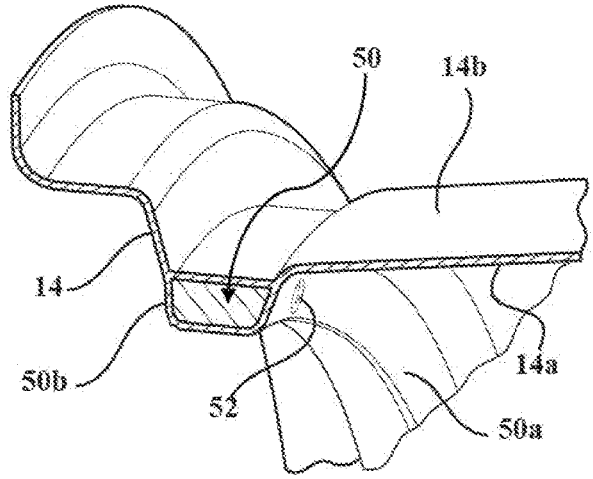
FIG. 5 is a detail view of the sectional view of FIG. 4 shown on an enlarged scale.
Figure 6:
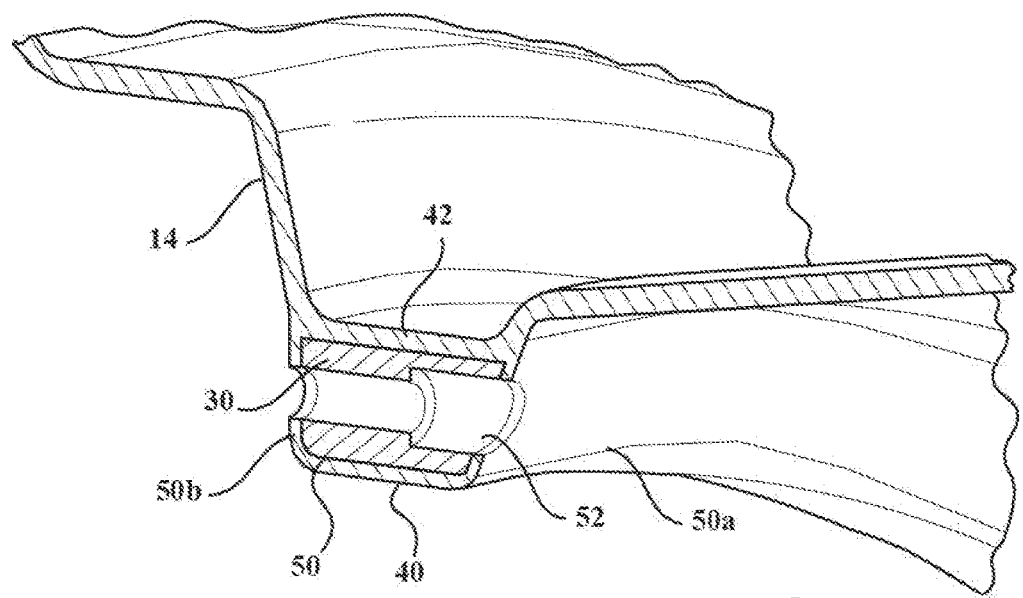
FIG. 6 is a sectional view of the detail view of FIG. 5, the cut taken through a center of a fastener hole of the first insert.

With reference to FIGS. 4-6, in one aspect, radially inner and outer surfaces 14a and 14b of the wheel rim 14 may be defined, at least in part, by a respective first layer 40 and a second layer 42 of material (further described below and shown in FIG. 19). At least a portion of the outer surface 14b of the wheel rim may define at least a portion of a pressure barrier associated with a sealed volume of a wheel/tire assembly when the tire is mounted to the wheel rim 14.

In one aspect, the second layer of material 42 extends radially between the attachment inserts 30 and the sealed volume, thereby preserving the pressure barrier. The first layer of material 40 may extend radially and laterally around the attachment inserts 30, thereby fully encapsulating the attachment inserts 30. With reference to FIG. 6, the first layer 40 may extend around the bottom and sides of the insert 30, with the top of the insert 30 being covered by the second layer 42.

In another aspect, the attachment inserts 30 may not be fully encapsulated and may be otherwise secured to the wheel rim 14. In some aspects, the attachment inserts 30 may include one or more roughened surface treatments and/or one or more feature or array of features, such as one or more spikes, or the like, to facilitate integration of the attachment inserts 30 with one or more of the layers 40, 42 (or additional layers) of the wheel rim 14.

With reference to FIGS. 3A and 3B, the wheel rim 14 may include a plurality of the attachment inserts 30, as described above, thereby defining a first hole pattern. The first hole pattern is configured to correspond with a second hole pattern associated with the wheel center 16, similar to that described above with respect to the apertures 18, such as a second hole pattern associated with the illustrated 5-spoke wheel center, and/or with one or more of a variety of hole patterns associated with one or more other wheel centers.

In one aspect, the wheel rim 14 includes a first number of attachment inserts 30 and the wheel center 16 includes a second number of spokes 20 or other features. In some embodiments, the first number is less than the second number such that one or more attachment insert 30 is configured to provide attachment support for more than one spoke 20 and/or other feature of the wheel center 16.

With reference to FIG. 3A, in an aspect, the inserts 30 may be attached to each to define a ring 44 that is disposed in the wheel rim 14. At least part of the ring 44 is formed by a plurality of spacer inserts 46 extending radially between the attachment inserts 30. In another aspect, the attachment inserts 30 are formed in a continuous ring of material, such that no spacers are required. In another aspect, the spacers 46 and attachment inserts 30 are integrated together in the attachment ring 44, such as by bonding the spacer inserts 46 to respective attachment inserts 30, or otherwise attached.

In one approach, each attachment insert 30 (or a continuous ring of material that includes the attachment insert) is formed, at least in part, from metal, plastic, and/or some other high-strength, rigid material now known or later developed. In some aspects, each spacer 46 is formed, at least in part, from a lightweight and/or inexpensive material, such as foam or the like. FIG. 6-8 illustrate the inserts 30 being formed of a single material type. However, as shown in FIG. 3C, the insert 30 may be formed by multiple material types, and may include a body portion 30a and a bushing portion 30b. In one aspect, the bushing portion 30b may be made of a higher-strength material than the body portion 30a, such that the bushing portion 30b may receive a larger installation load for supporting the fastener 32. It will be appreciated that other multi-material or multi-component insert constructions could also be used.

In one aspect, the wheel rim 14 may include a continuous spacer ring constructed primarily of foam or some other low-strength material. In some such embodiments, the spacer ring includes a steel sleeve insert, which may be considered the attachment insert 30, and/or one or more other high-strength portion positioned at or near one or more desired attachment locations.

As shown in FIG. 3B, the attachment inserts 30 may be spaced apart and not connected to each other by spacer inserts or the like, and the wheel rim 14 may define distinct insert regions (not explicitly shown). These insert regions in the wheel rim 14 may be formed by a corresponding mold shape, which includes a depression or cavity at the distinct regions that will receive the inserts 30.

In this approach, each distinct insert region is configured to align with one or more corresponding spoke 20 or other feature of a respective wheel center 16. In one aspect, shown in FIG. 3B, each attachment insert 30 may include opposed transition sections 48 disposed on opposite circumferential sides of the insert 30. In this approach, each transition section 48 may be configured to facilitate a flow of composite material over at least a portion of such transition section 48 and over at least a portion of the attachment insert 30 as a whole, thereby facilitating securement of the attachment inserts 30 to the wheel rim 14 by positioning at least a portion of each attachment insert 30 between the first and second layers 40, 42 of material.

In one aspect, as shown in FIGS. 4-8, the attachment inserts 30 may be positioned in a drop well region 50 of the wheel rim 14. In one approach, the drop well region 50 defines an inner surface 50a and an outer surface 50b that are opposed to each other, and a plurality of bores 52 extending therebetween. In an aspect, the outer surface 50b of the drop well region 50 is configured to interface with an inner surface of the wheel center 16, thereby sealing an outer opening of the bores 52 as shown in FIGS. 7 and 8.

In one aspect, each bore 52 is defined at least in part by the attachment insert 30, as shown in FIGS. 6-8. The bores 52 may be a double bore and/or a countersunk bore to allow a head of the respective attachment fastener 34 to be recessed within the drop well region 50.

In one aspect, shown in FIG. 8, an inboard seal plate 54 is secured to the inner surface 50a of the drop well region 50, thereby sealing an inner opening of the bore 52. In one approach, a plurality of local inboard seal plates 54 are positioned at each fastener location. In one approach, one or more inboard seal plates 54 extend over several fastener locations. In one aspect, the inboard seal plate 54 is bolted, bonded, or otherwise secured in place. In some aspects, the inboard seal plate 54 may include one or more sealing membrane.

In another aspect, shown in FIGS. 7 and 8, an outboard seal 55, which may in the form of an o-ring seal or a dispensed sealant bead, may be disposed axially between the wheel center 16 and the wheel rim 14. When the wheel center 16 is secured to the wheel rim 14 by the fastener 32, the outboard seal 55 may be axially compressed between the wheel center 16 and the wheel rim 14, thereby providing a seal around the fastener 32.

With reference to FIG. 7, as an alternative to the seal plate 54, a seal plug 57 may be disposed in the inboard opening of the bore 52 to seal the inboard end of the fastener 32. The seal plug 57 may be in the form of a dispensed sealant that may be injected into the inboard end of the bore 52, or the seal plug 57 may be a skived RTV (room temperature vulcanizing) material. Thus, whether using the sealing plate 54 or the seal plug 57, the inboard side of the bore may be sealed.

As shown in FIGS. 6-8, the fastener 32 and the bore 52 has been illustrated as having an axial orientation. It will be appreciated that the axis of the fastener 32 through the insert 30 and the axis of the bore 52 need not be perfectly axial or aligned with the axis of the wheel 12. Indeed, the axis of the fastener 32 and the bore 52 may be disposed at an angle relative to the axis of the wheel 12.

The present disclosure further includes a method of forming the wheel rim 14 with the inserts 30. FIGS. 9-21 illustrate various structure and steps associated with forming the wheel rim. In one aspect, the method includes utilizing a mold assembly 60 (FIG. 9) during one or more lay-up processes to form one or more features of the wheel rim 14. In one aspect, at least one lay-up step includes positioning the first layer 40 of material on the mold assembly 60 and/or draping the first layer 40 of material to the mold assembly. The process may further include forming a first preform 62 that is configured to be positioned on and/or draped to the mold assembly 60. The first preform 62 may include the first layer 40 of material.

In one aspect, the first preform 62 and/or one or more other preform may include one or more layer of reinforcement materials. The layers may provide varying degrees of coverage. In some aspects, one or more layer of the preform 62 and/or wheel rim 14 includes an orientation, material, and/or thickness that differs from one or more other layer of the respective preform 62 and/or wheel rim 14. In some aspects, one or more layer of material of the wheel rim 14 includes a plurality of elongated fiber materials and/or a polymer and/or non-polymer matrix. In one aspect, a polymer and/or non-polymer matrix is added to one or more fiber layer and/or other layer prior to, during, and/or after a first lay-up step, a last lay-up step, and/or one or more intermediate lay-up step.

Figure 9:
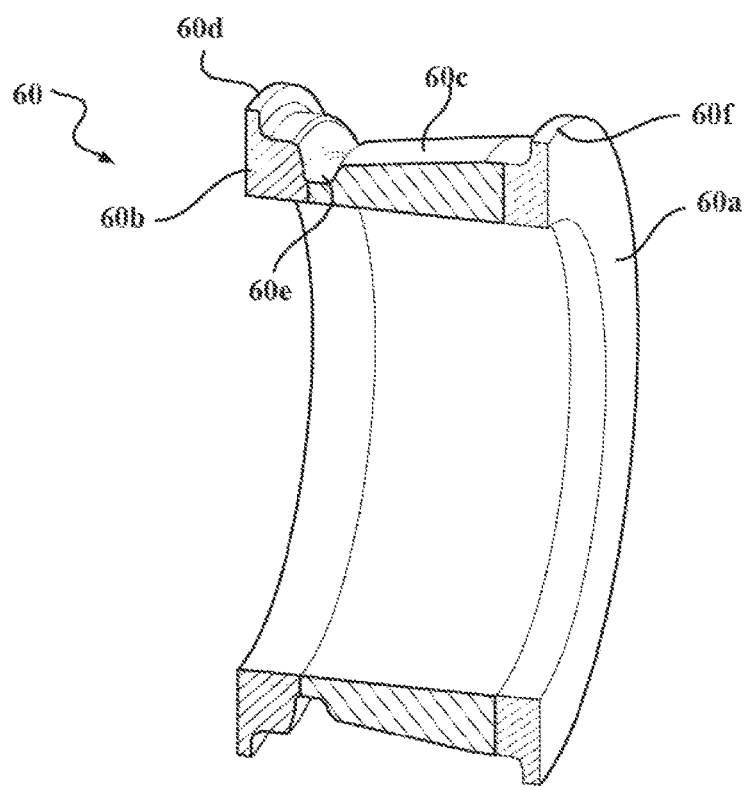

In one aspect, shown in FIG. 9, the mold assembly 60 includes an inner portion 60a, an outer portion, 60b and a center portion 60c extending therebetween. In one aspect, the outer portion 60b of the mold assembly may include an outer lip 60d for forming an outer flange of the wheel rim 14, such as an outer bead of the wheel rim 14. The outer portion 60b and/or the center portion 60c may define a recessed area 60e for forming the drop well region 50 of the wheel rim 14. In some aspects, the inner portion 60a of the mold assembly 60 includes an inner lip 60f for forming an inner flange of the wheel rim 14, such as an inner bead of the wheel rim 14.

In one aspect, the method of forming the wheel rim 14 may include draping a plurality of layers of composite material such that they follow one or more feature of the mold assembly 60. The method may further include positioning one or more inserts 30 between one or more layer of material, thereby fully or partially encapsulating the inserts 30 therein and/or otherwise securing the inserts 30 to the layers of material. For the purposes of discussion, the first and second layers 40, 42 will be referenced. However, it will be appreciated that multiple other layers could be applied to the mold assembly 60 before and/or after placing the inserts 30 on the mold assembly 60.

Figure 10:
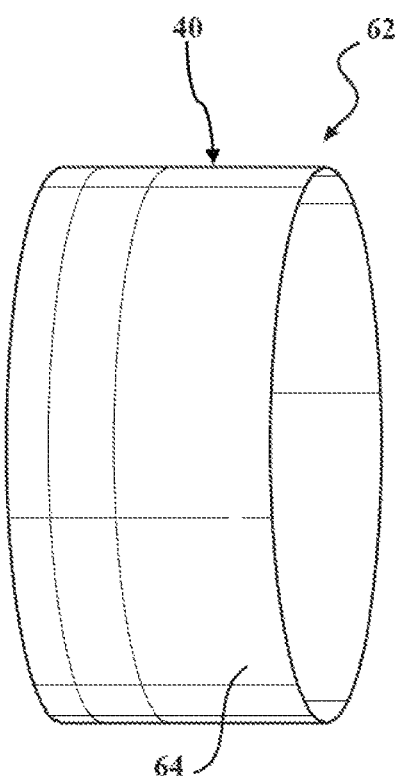
FIG. 10 is a perspective view of a first tube preform of the present invention, the first tube preform shown in a first configuration.

In one approach, illustrated in FIG. 10, the method includes forming the first preform 62 in the form of a tube (a "first tube preform 64"). The first tube preform 64 may be formed using a largely featureless tool (not shown). The tube preform 64, and any other tube preforms described herein, may be formed via roll wrapping. In this process, one or more layers of composite material may be provided in roll form and wrapped circumferentially to form a tubular shape. The forming of the tubular shape may be performed over a male mandrel, on the interior of a round cavity, or without the use of a forming tool. The forming may also occur with the tubular shape in a vertical or horizontal orientation. Butt splices, underlaps, or overlaps may be used to terminate individual or multiple material layers. In the case of the tube preform having multiple layers, the layers may be different materials and may have different material orientations. Film adhesive, tackifier, or other common material and methods can be used to stabilize the preform, thereby allowing the preform to maintain the predominantly tubular shape during subsequent operations.

The first tube preform 64 may be configured to slide over at least part of the mold assembly 60 so as to allow the first tube preform 64 to be draped thereon, thereby forming the first layer 40 of the wheel rim 14. As described above, the first layer 40 of the wheel rim 14 may define an inner surface of the wheel rim 14 when the wheel rim 14 has been formed.

Figure 12A:
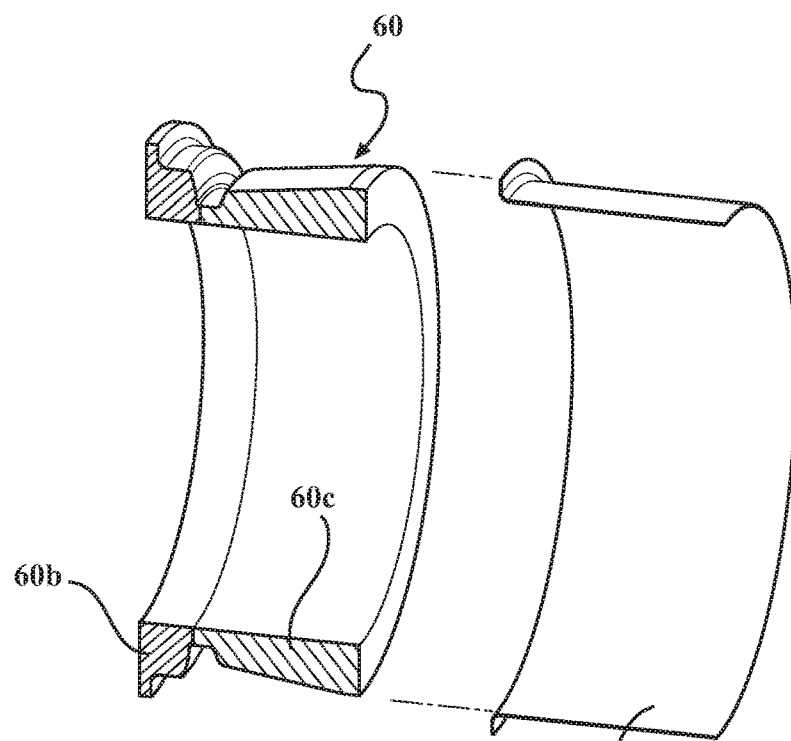
FIG. 12A is a sectional perspective view of the first tube preform of FIG. 10 aligned with the mold assembly of FIG. 9, the first tube preform being in a second configuration, as shown in FIG. 11, and the inner portion of the mold assembly being removed.

In one aspect, an inner diameter of the first tube preform 64 is smaller than an outer diameter of the inner portion 60a of the mold assembly 60. In this approach, the method may include removing the inner portion 60a of the mold assembly 60 prior to engaging the first tube preform 64 with the mold assembly 60. FIG. 12A illustrates the mold assembly 60 with the inner portion 60a removed.

Figure 12B:
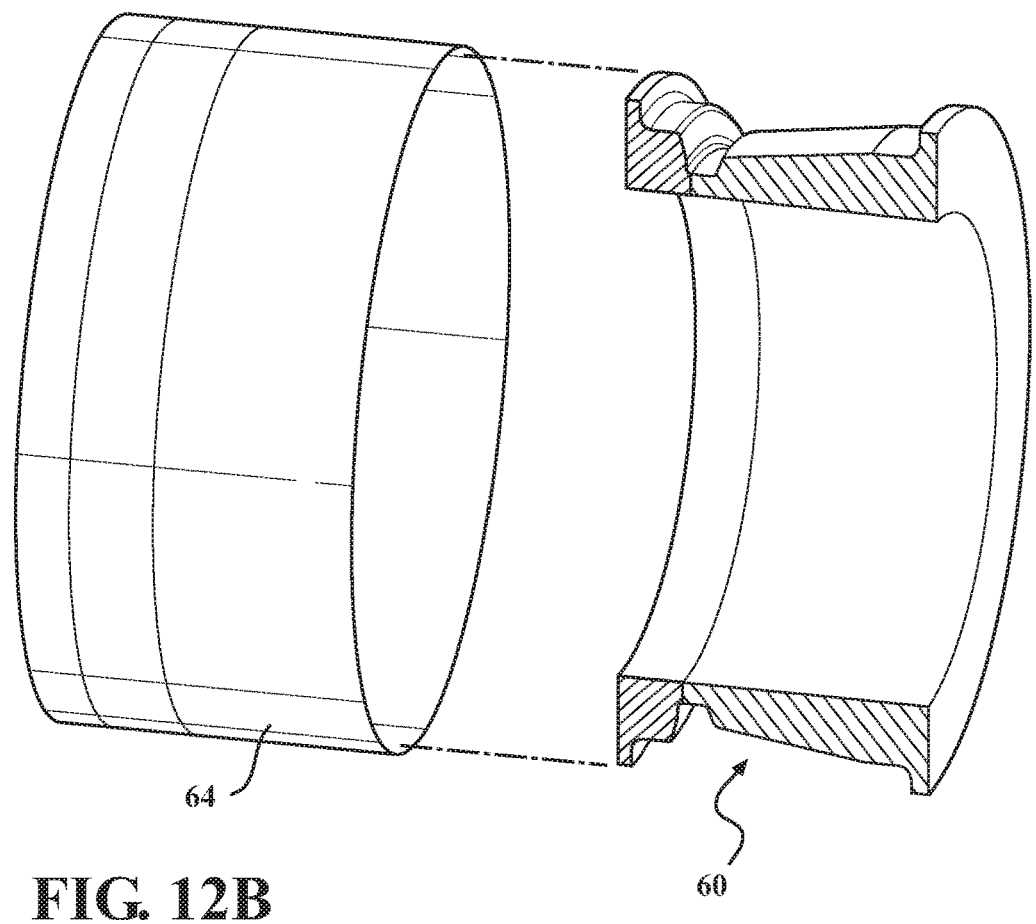
FIG. 12B is a perspective view of a tube preform have a greater diameter than the mold assembly.
Figure 13:
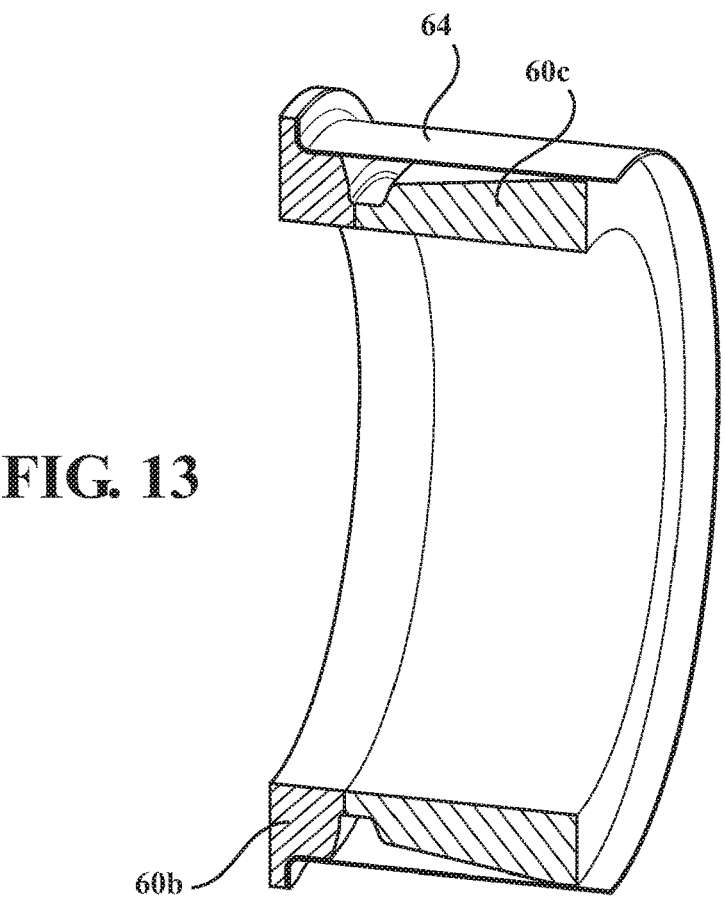
FIG. 13 is a sectional view of the first tube preform being positioned on the mold assembly.

In one approach, the inner diameter of the first tube preform 64 is generally equivalent to an outer diameter of a distal end of the center portion 60c of the mold assembly 60, as shown in FIG. 13, thereby allowing the first tube preform 64 to engage with the mold assembly 60 by sliding the first tube preform 64 over the distal end of the center portion 60c of the mold assembly 60, as illustrated in FIGS. 12 and 13.

In another aspect, the tube preform 64 may be inserted onto the mold assembly 60 from the outboard side of the mold assembly 60. In this approach, the outer portion 60b of the mold assembly 60 may be removed to facilitate installation of the tube preform 64.

Figure 14:
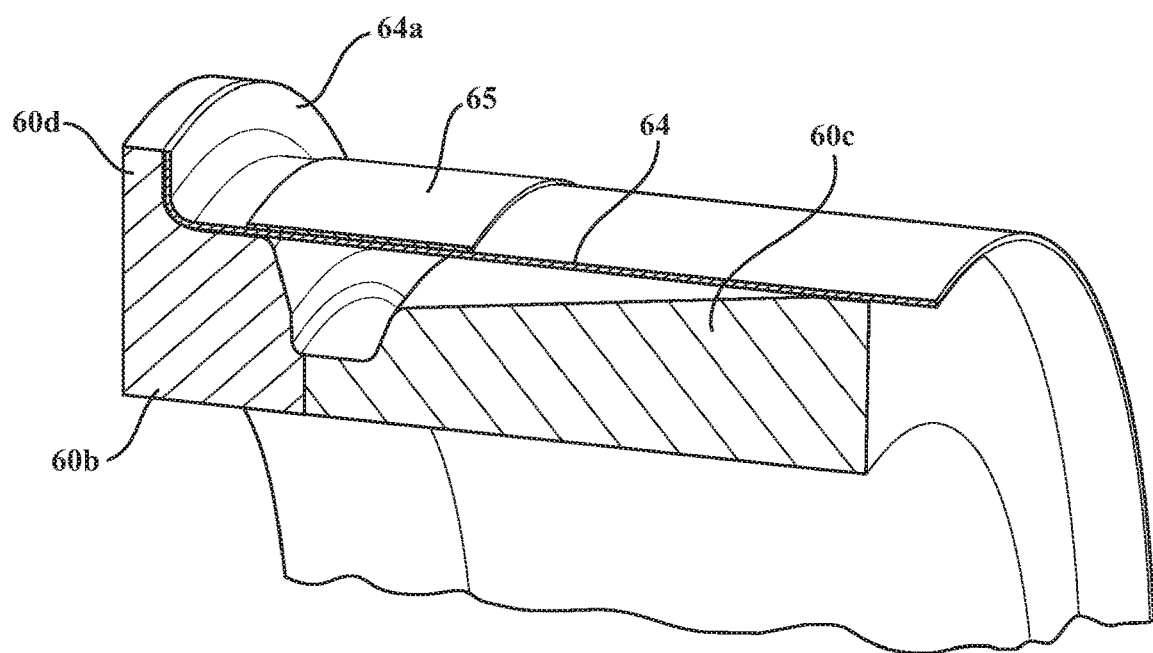
FIG. 14 is detail view of the stack-up of FIG. 13 shown on an enlarged scale.

In one approach, additional preforms 65 are installed after or before the first tube preform in localized portions of the mold assembly 60 corresponding to localized portions of the resulting wheel rim 14 after molding and curing. FIG. 14 illustrates the additional preform 65 being installed over the first preform 64 on the mold assembly 60. In one approach, the localized preforms 65 are placed corresponding to the bead regions of the rim 14 to provide reinforcement in the bead regions.

In some aspects, the tube preform 64 diameter may be greater than the outer diameters of the mold assembly 60. In this approach, the tube preform 64 may be installed without removing a portion of the mold assembly 60. An example of this arrangement is illustrated in FIG. 12B, in which the tube preform 64 is shown with a larger diameter than the mold assembly 60, such that the sections of the mold assembly are shown in an assembled state without removal of the outer portion.

Figure 11:
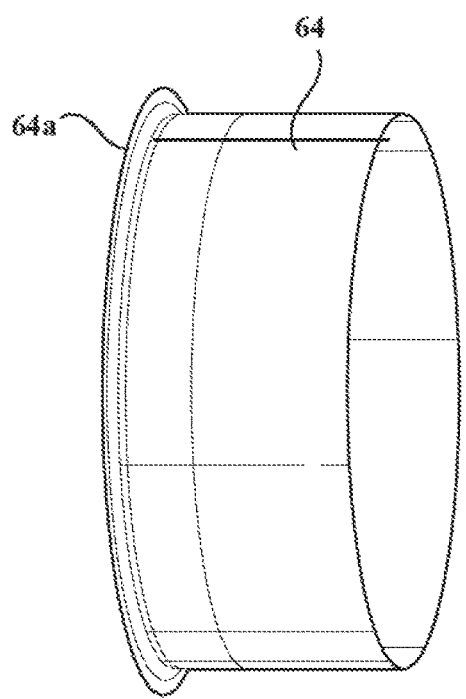
FIG. 11 is a perspective view of the first tube preform of FIG. 10, the first tube preform shown in a second configuration.
Figure 15:
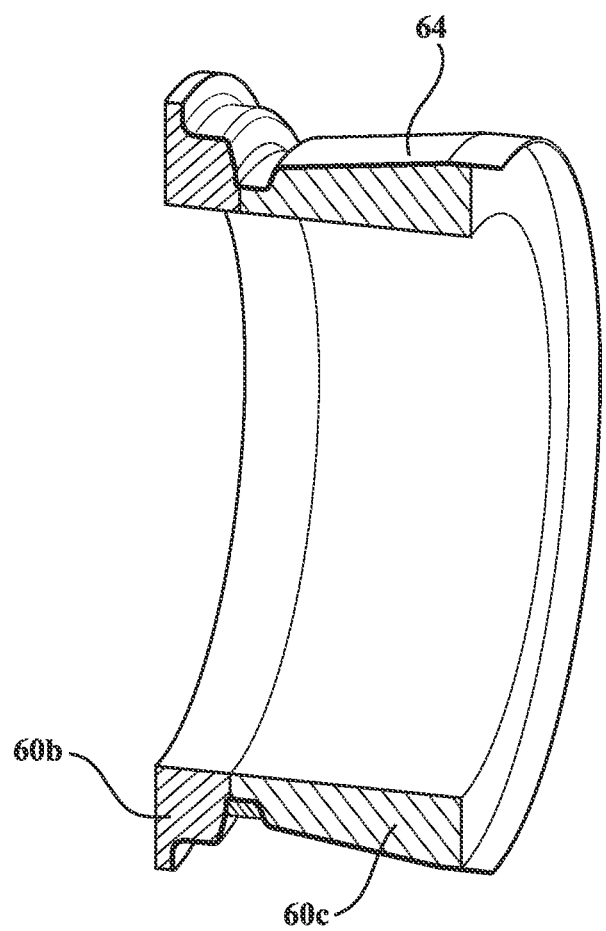
FIG. 15 is a sectional view of the stack-up of FIG. 14, the first tube shown in a third configuration draped against the mold assembly.

With reference to FIG. 11, in one aspect, the method includes folding a proximal end of the first tube preform 64 so as to form at least part of a first radial flange 64a, such as at least part of an outer bead flange of the wheel rim 14, thereby moving the first preform 64 from a first configuration to a second configuration. In this approach, the method may include moving the first radial flange 64a into engagement with the outer lip 60d of the mold assembly 60 while the first tube preform 64 remains generally in its second configuration, as shown in FIG. 14. In one approach, the method may include draping the first tube preform 64 against the outer portion 60b of the mold assembly 60 and/or against the center portion 60c of the mold assembly 60 while maintaining engagement of the first radial flange 64a with the outer lip 60d of the mold assembly 60, thereby moving the first tube preform 64 to a third configuration, as shown in FIG. 15.

In one aspect, one or more biasing items is utilized to move the first tube preform 64 to the third configuration and/or to retain the first tube preform 64 in the third configuration. For example, the biasing items may include a high-strength strand material, reinforcement fiber, one or more vacuum bag, one or more bladder, and/or one or more roller and/or actuator. In some aspects, utilization of the biasing items includes winding such biasing item around the preform 64, such as by turning the mold 60, positioning such biasing item against and/or into close proximity with the first tube preform 64, and/or inflating, deflating, and/or actuating one or more such biasing item. In some embodiments, one or more preform 64 and/or layer of material is draped against an external mold and/or an external feature of one or more mold. In this approach, one or more biasing item is utilized to move the preform 64 and/or layer of material into engagement with one or more feature, such as by positioning one or more bladder into close proximity to such preform and/or layer of material and inflating and/or otherwise expanding such bladder and/or bladders so as to bias such material into position.

In one aspect, one or more full or partial preform and/or layer of material 65 ("additional layer of material") is positioned on and/or otherwise draped onto the first tube preform 64. In some aspects, one or more additional layer of material 65 is configured to create predominately axially oriented stiffeners in the well region 50 that receives the insert 30 of the wheel rim 14 and/or to otherwise create and/or contribute to the creation of one or more stiffened region of the wheel rim 14. An example of this approach is shown in FIG. 14. In another approach, one or more additional layer of material 65 is draped onto the first tube preform 64 while the first tube preform 64 is in the third configuration shown in FIG. 15.

Figure 16:
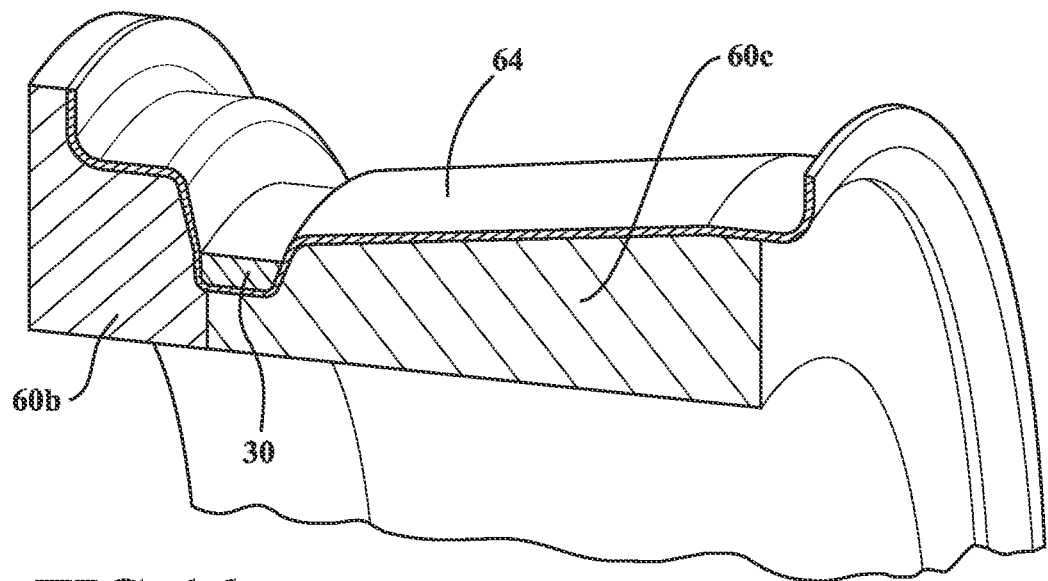
FIG. 16 is a detail view of the stack-up of FIG. 15 shown on an enlarged scale.

With reference to FIG. 16, in one aspect, the method includes positioning one or more attachment inserts 30 and/or spacer insert 46 into position relative to the first tube preform 64. In one aspect, the method includes positioning the one or more insert 30 into the recessed area 60e of the mold assembly 60.

The method may further include positioning one or more additional layer of material 65 on and/or adjacent to one or more insert 30 that has been placed within the recessed area 60e, thereby encapsulating such insert 30 and/or otherwise creating an attachment feature for securing such insert to such wheel rim. In some aspects, one or more other material, such as a fiber material, a polymer material, a non-polymer material, and one or more other material is used to encapsulate and/or to secure the one or more insert 30 to one or more layer of material.

Figure 19:
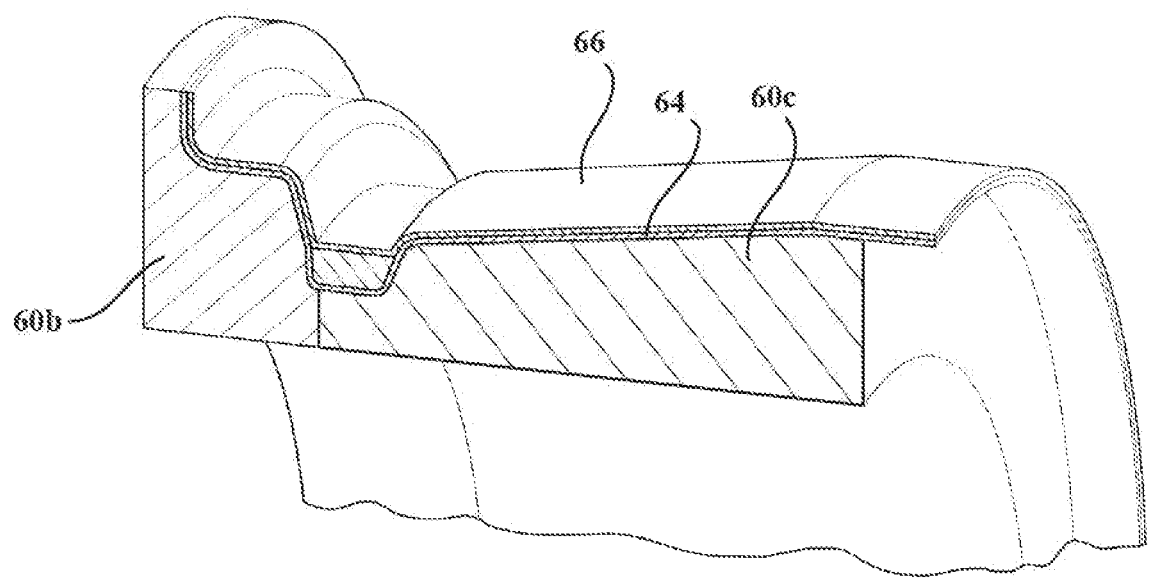
FIG. 19 is the detail view of FIG. 18A showing the second tube preform in a third configuration draped in a similar manner as the first tube preform.

With reference to FIGS. 17-19, the method may further include forming a second preform in the form of a tube (a "second tube preform 66"). In some embodiments, the second tube preform 66 is substantially similar to the first tube preform 64, and may be shaped or adjusted in shape in a similar manner as that described above. In one approach, the second tube preform 66 may be shorter in length than the first tube preform 64. In another approach, the second tube preform 66 may be longer in length than the first tube preform 64. In one approach, the second tube preform 66 is formed using a largely featureless tool.

The second tube preform 66 may be configured to slide over at least part of the first tube preform 64 while the first tube preform is in its third configuration. FIGS. 17-18A illustrate the second tube preform 66 sliding over the first tube preform 64. The second tube preform 66 may be configured to slide over a plurality of inserts 30 associated with the first tube preform 64, thereby encapsulating such inserts 30 within the wheel rim 14 and/or otherwise securing such inserts 30 to the wheel rim 14.

With reference to FIG. 19, in one aspect, the second tube preform 66 is configured to be draped onto the first tube preform 64, one or more insert 30, and/or one or more additional layer of material, as applicable, thereby forming the second layer 42 of the wheel rim 14. The second layer 42 of the wheel rim 14 may define the outer surface 14b of the wheel rim 14. Thus, at least a portion of the second layer 42 of the wheel rim 14 may form at least a portion of a pressure barrier of the wheel rim 14.

In one approach, an inner diameter of the second tube preform 66 is generally equivalent to an outer diameter of the first tube preform 64 when measured at a distal end of the center portion 60c of the mold assembly 60 (shown in FIG. 19), thereby allowing the second tube preform 66 to engage with the first tube preform 64 by sliding the second tube preform 66 over the first tube preform 64.

With reference to FIG. 17, in one approach, the method may include folding a proximal end of the second tube preform 66 so as to form at least part of a first radial flange 66a, such as at least part of an outer bead flange of the wheel rim 14, thereby moving the second tube preform 66 from a first configuration (similar to that shown in FIG. 10 for the first preform 64) to a second configuration. The method may include moving the first radial flange 66a of the second tube preform 66 into engagement the first radial flange 64a of the first tube preform 64. The method may further include draping the second tube preform 66 against the first tube preform 64, against one or more insert 30, and/or against one or more additional layer of material, as applicable, thereby moving the second tube preform to a third configuration, as shown in FIG. 19.

In one aspect, one or more biasing items is utilized to move the second tube preform 66 to its third configuration and/or to retain the second tube preform 66 in its third configuration. The biasing items may include high-strength strand material, reinforcement fiber, one or more vacuum bag, one or more bladder, and/or one or more roller and/or actuator. In one approach, utilization of the biasing items includes winding such biasing item around the preform, such as by turning the mold, positioning such biasing item against and/or into close proximity with the first tube preform, and/or inflating, deflating, and/or actuating one or more such biasing item.

Figure 20:
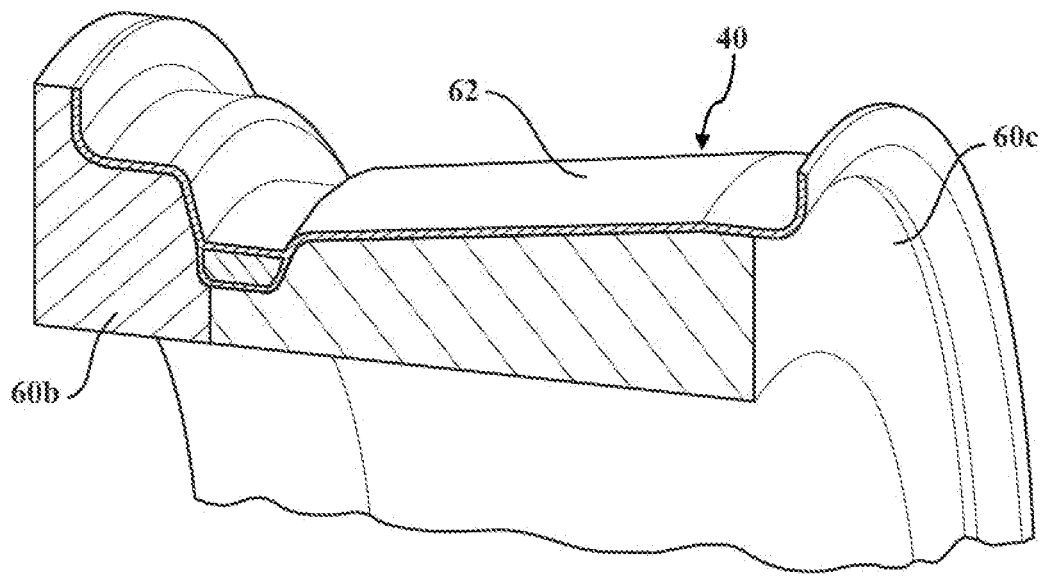
FIG. 20 is the detail view of FIG. 19 showing the first and second tube preforms in respective fourth configurations.

With reference to FIG. 20, a distal end of the first tube preform 64, the second preform 66, and/or one or more additional layer of material is folded to facilitate reinstallation of the inner portion 60a of the mold assembly 60, thereby moving the first and/or second tube preform 64, 66 into a respective fourth configuration. In one approach, additional preforms may be installed before moving the preforms into a fourth configuration.

Figure 21:
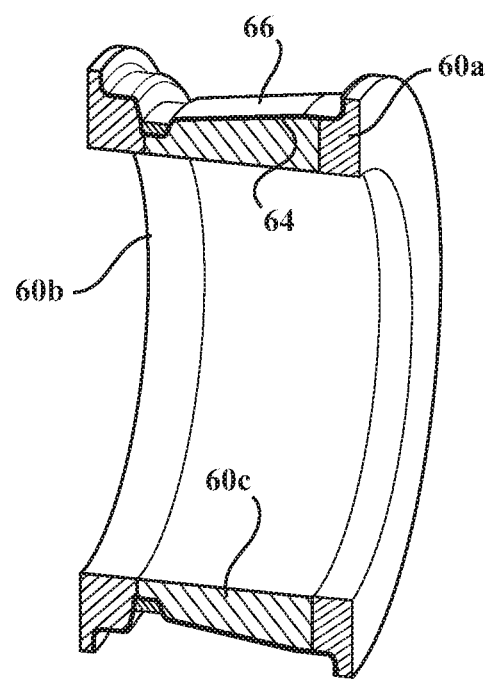
FIG. 21 is a perspective sectional view of the stack-up of FIG. 20 showing an inner portion of the mold assembly being reinstalled to a center portion of the mold assembly.

With reference to FIGS. 20 and 21, in one approach the folded portion of respective preforms 64, 66 and/or layers of material are draped against the inner portion 60a of the mold assembly 60, thereby moving such preforms and/or layers of material to a final configuration and/or forming an inner flange 64a, 66a of the wheel rim 14, such as an inner bead of the wheel rim 14.

In one approach, one or more additional layer of material is positioned on and/or otherwise draped onto the first and/or second tube preform 64, 66, onto one or more insert, and/or onto one or more other additional layer of material while the first and/or second tube preform 64, 66 is in a third or fourth configuration and/or when the wheel rim 14 is in the final configuration and/or as the wheel rim 14 is moved to its final configuration. The one or more additional layer of material may be configured to create predominately axially oriented stiffeners in an insert region of the wheel rim 14 and/or to otherwise create and/or contribute to the creation of one or more stiffened region of the wheel rim 14.

The method may further include curing the wheel rim 14 and/or removing the wheel rim 14 from the mold assembly 60 prior to drilling one or more of the bores 52 through one or more attachment insert 30 of the wheel rim 14. In one approach, the wheel center 16 is secured to the wheel rim 14 utilizing one or more attachment fastener 34 and one hole associated with such attachment fasteners 34 is sealed utilizing one or more seal plates 54. In one aspect, one or more attachment insert 30 is bored prior to being installed within and/or to a wheel rim 14. In this approach, the wheel rim 14 may be bored or machined as desired to provide access to the bore 52 formed in the insert 30.

Figure 22:
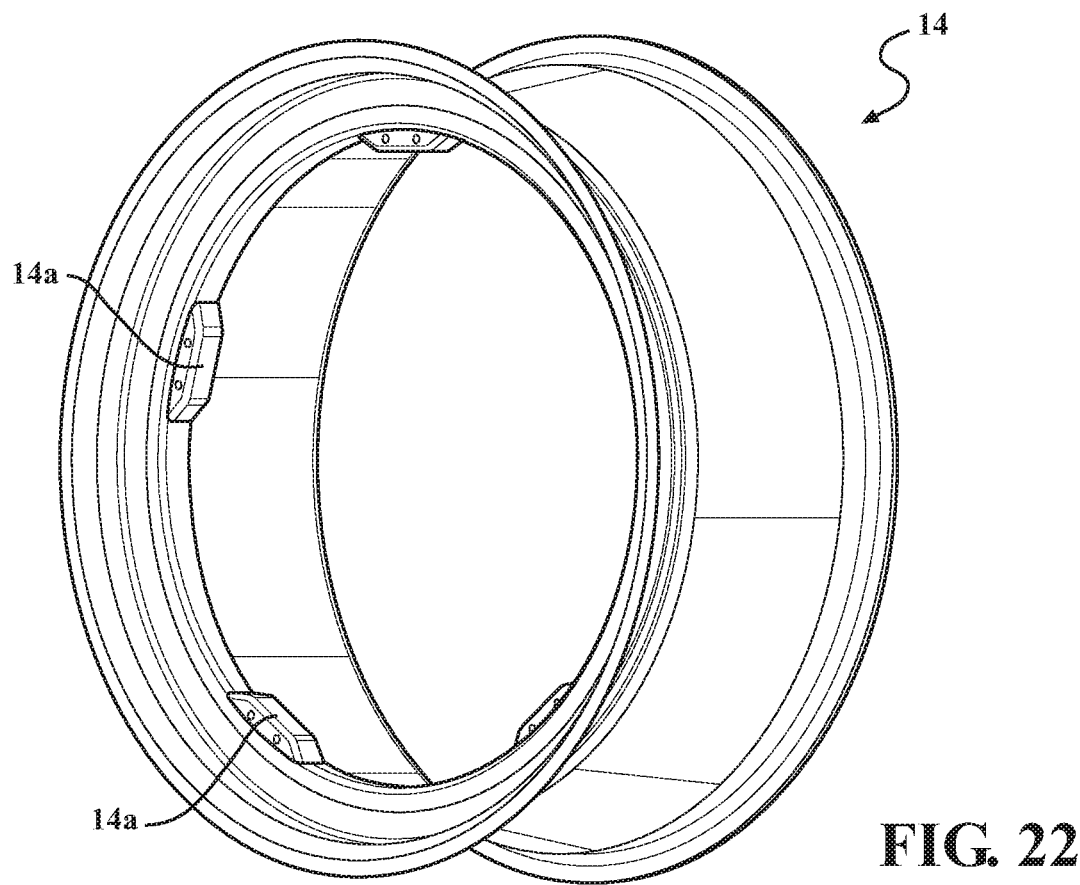
FIG. 22 is a perspective view of another aspect of the wheel rim illustrating a non-revolute inner surface.
Figure 23:
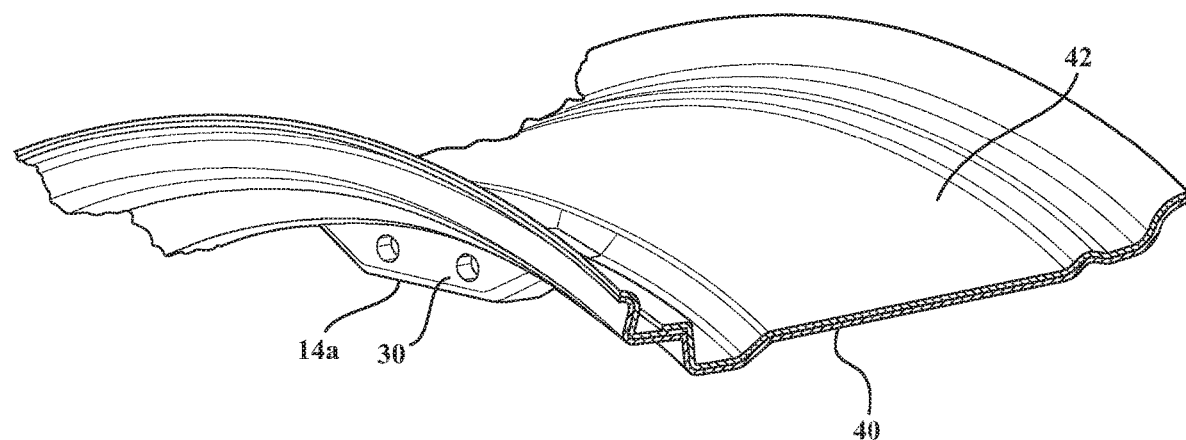
FIG. 23 is a perspective sectional view of the wheel rim of FIG. 22.
Figure 24:
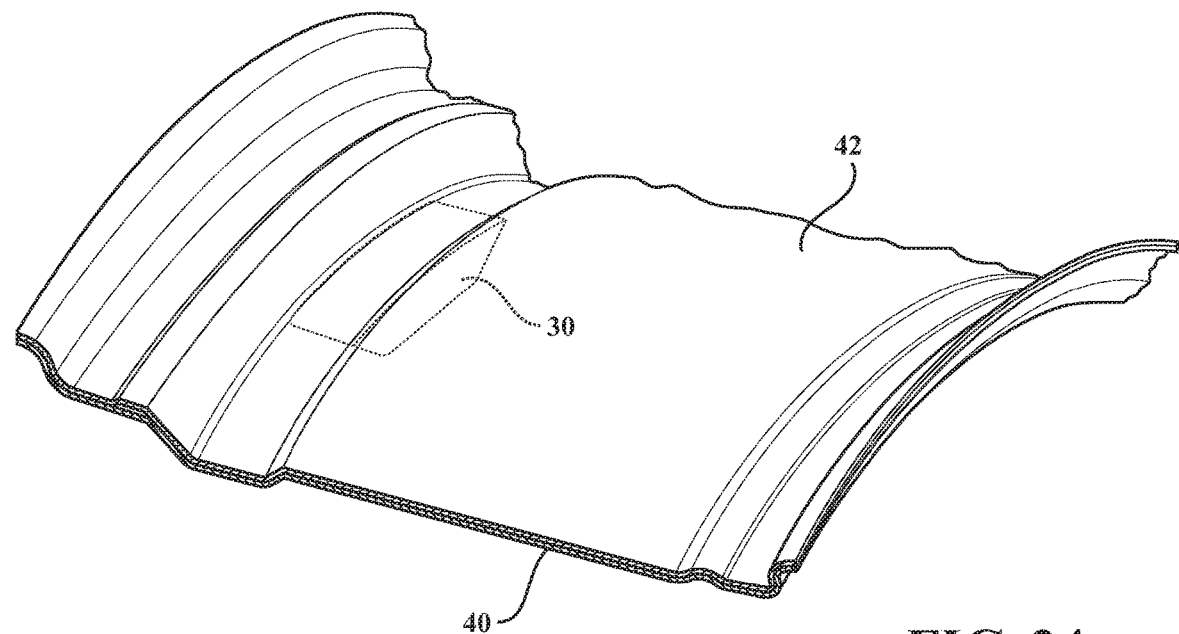
FIG. 24 is a perspective sectional view of the wheel rim of FIG. 22.
Figure 25:
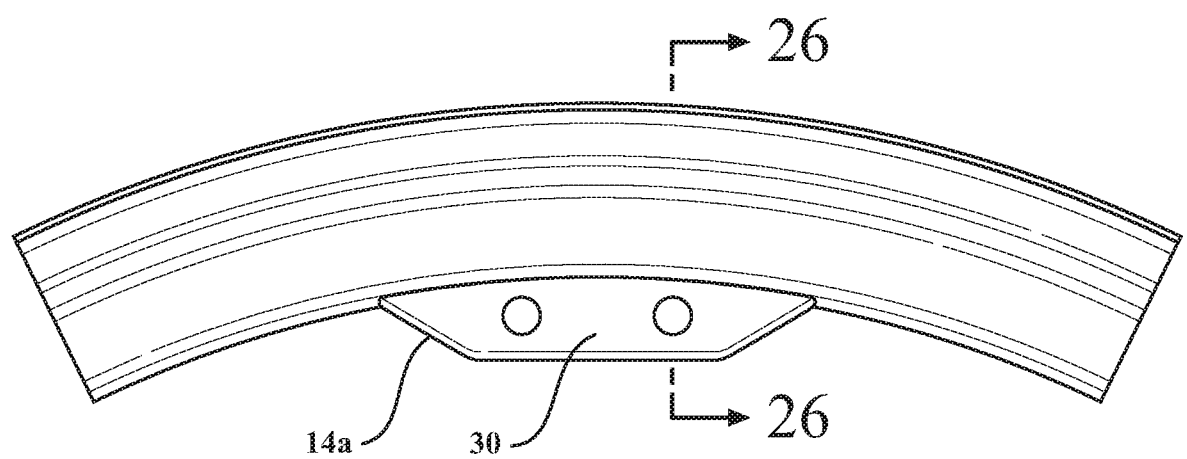
FIG. 25 is a partial side view of the wheel rim of FIG. 22.
Figure 26:
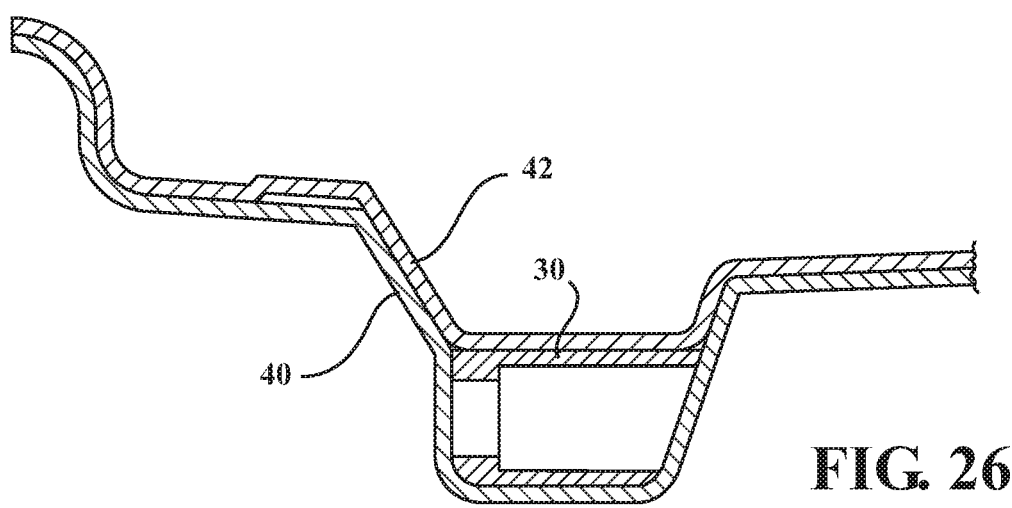
FIG. 26 is a sectional view of the wheel rim of FIG. 22 taken along the line 26-26 of FIG. 25.

As shown throughout the Figures already discussed, the mold assembly 60 has a "revolute" trough or the like that defines a wheel rim 14 with a revolute inner geometry, such that the inner diameter below the first layer 40 is generally constant. However, in another aspect, the wheel rim 14 may be formed with a non-revolute inner geometry. An example of the non-revolute inner geometry is shown in FIG. 22.

As shown in FIGS. 22-26, the geometry of the wheel rim 14 that houses the inserts 30 may project toward the center relative to the inner diameter of the wheel rim 14. Accordingly, the wheel rim 14 may include a plurality of insert projections 14a that include the inserts 30 disposed therein. In this approach, the first layer 40 remains the first layer to be applied to the mold assembly 60 as a preform, with the inserts 30 being disposed over the first layer 40, and the second layer 42 is disposed over the inserts 30 following their insertion. The mold assembly 60 may include a plurality of insert pockets (not explicitly shown on the mold assembly 60) into which the first layer 40 may be draped, with the inserts 30 thereafter positioned into the pockets formed in the first layer 40.

The inserts 30, after being placed into the pockets, may be generally flush with the non-pocketed portion of the first layer 40, such that the second layer 42 that is subsequently applied will have a generally flat profile. Thus, the outer diameter of the wheel rim 14 may be axisymmetric (revolute), while the inner diameter is non-axisymmetric (non-revolute). Alternatively, the inserts 30 may also project radially outward from the non-pocketed portion of the first layer 40, and the second layer 42 may have an outer profile with radially outward projections, or the like. Thus, both the inner and outer diameters of the wheel rim 14 may be non-axisymmetric (non-revolute).

Figure 27:
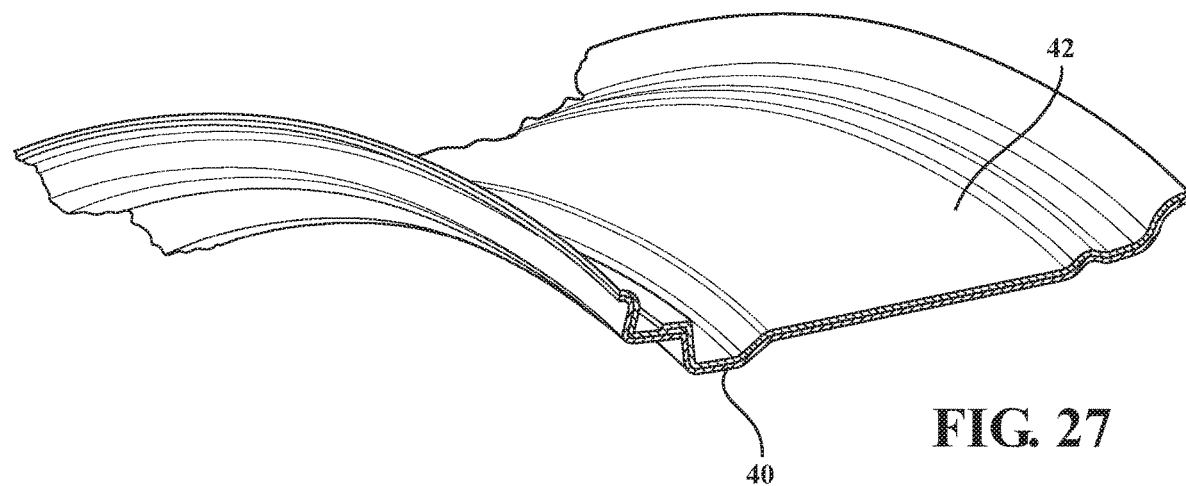
FIG. 27 is a partial perspective view of another aspect of the wheel rim illustrating a revolute inner surface.
Figure 28:
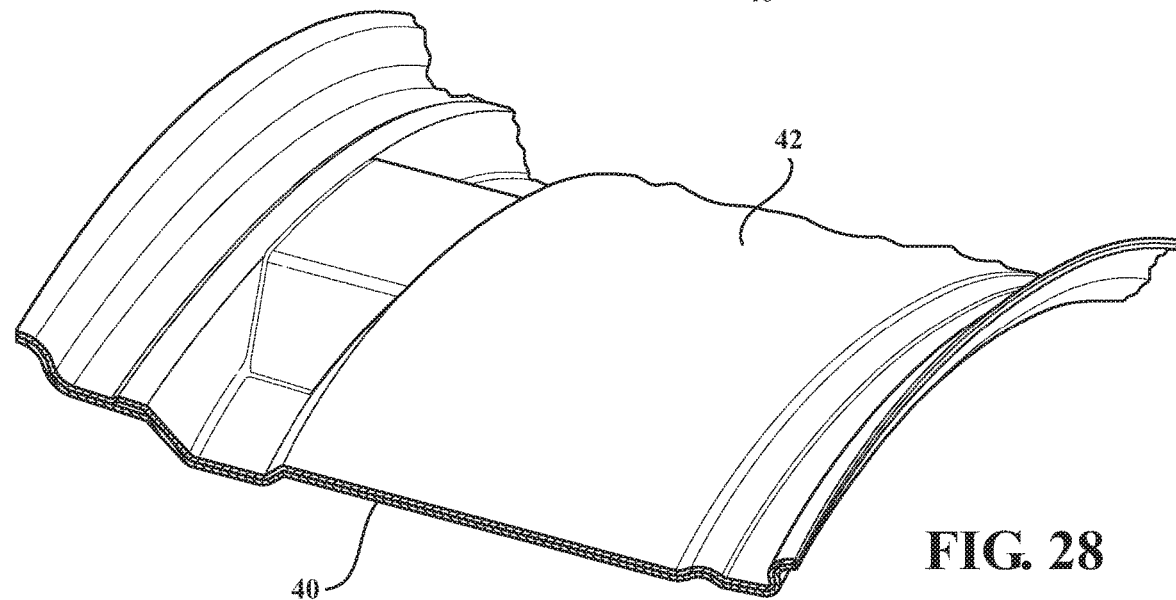
FIG. 28 is a partial perspective view of the wheel rim of FIG. 27 illustrating a non-revolute outer surface.
Figure 29:
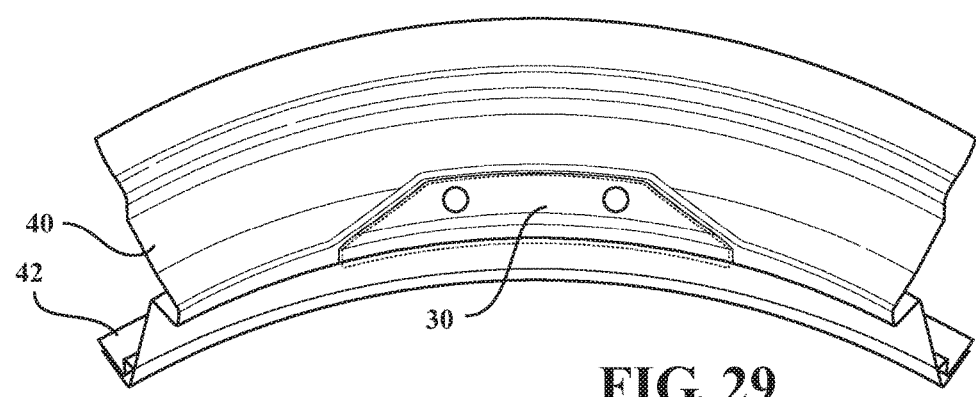
FIG. 29 is partial perspective view of the wheel rim of FIGS. 27 and 28 illustrating an insert extending radially outward from the revolute inner surface.

In another approach, shown in FIGS. 27-29, the inserts 30 may be placed over the first layer 40, which forms an inner revolute surface. This arrangement may be used with the inserts 30 shown in FIG. 3B, where there is no spacer ring between the inserts. This arrangement differs from the arrangement shown in FIG. 22-26 in that the inserts 30 do not project radially inward relative to the rest of the inner surface defined by the first layer 40. Rather, the inserts 30 project radially outward from the revolute first layer 40, and are covered by the second layer 42, such that the radially outer surface defined by the second layer 42 is non-revolute. Put another way, the second layer 42 is draped over the top of the insert 30 and defines an axisymmetric trough on the radially outer surface of the wheel rim 14.

In the case of the inserts 30 including the spacer material 46 shown in FIG. 3A, the inner and outer radial surfaces defined by the first and second layers 40, 42 would both be revolute surfaces.

In each of the above aspects, the insert 30 has been disposed radially between the first layer and the second layer (where each of these "layers" may be a combination of multiple layers of material or plies). In an axial direction, the insert 30 is disposed between axially inner and outer portions of the bottom layer/ply stack. When formed on the mold assembly 60, the first layer 40 will form a radially inner surface and a radially outer surface, with the radially outer surface defining, in part, a radially outer volume, which corresponds generally to the sealed volume of the tire and wheel assembly when a tire is mounted. Thus, the fastener 32, or the axis of the fastener 32 will effectively pass through the sealed volume of the tire and wheel assembly. The insert 30 itself is sealed from the sealed volume by the second layer, where the plies of the second layer cover the insert. Put another way, the fastener 32, or the axis of the fastener 32, enters and exits the outer volume defined by the first layer 40, which is made possible by the provision of the insert 30 into this outer volume and the second layer 42 that covers the insert 30 and defines its own outer volume.

The foregoing and other objects are intended to be illustrative of the disclosure and are not meant in a limiting sense. Many possible embodiments of the disclosure may be made and will be readily evident upon a study of the following specification and accompanying drawings comprising a part thereof. Various features and subcombinations of the disclosure may be employed without reference to other features and subcombinations. Other objects and advantages of this disclosure will become apparent from the following description taken in connection with the accompanying drawings, wherein is set forth by way of illustration and example, an embodiment of this invention and various features thereof.

What is claimed is:

1. A composite wheel assembly comprising:
a composite wheel rim having a radially inner surface and a radially outer surface;
a plurality of attachment inserts disposed radially between the radially inner surface and the radially outer surface of the wheel rim;
a wheel center attached to the composite wheel rim, wherein at least one fastener engages at least a portion of the attachment insert and secures the wheel center to the composite wheel rim;
at least one first layer of composite material defining the radially inner surface; and
at least one second layer of composite material defining the radially outer surface;
wherein the attachment insert is disposed radially between the first layer of composite material and the second layer of composite material.

2. The assembly of claim 1, wherein the radially outer surface is configured to enclose at least a portion of a sealed volume defined between the wheel rim and a tire when the tire is attached.

3. The assembly of claim 1, wherein the wheel rim defines a drop well region disposed radially between the radially inner and radially outer surfaces, and at least one of the plurality of inserts is disposed in the drop well region.

4. The assembly of claim 3, wherein a plurality of spacer inserts are disposed circumferentially between circumferentially adjacent inserts and couple the plurality of inserts to each other.

5. The assembly of claim 4, wherein the spacer inserts are disposed in the drop well region.

6. The assembly of claim 3, wherein the plurality of inserts are spaced apart circumferentially from each other and are not coupled to each other.

7. The assembly of claim 6, wherein the drop well region comprises a plurality of regions that are circumferentially spaced apart from each other, and a respective one of the inserts is disposed in each of the plurality of regions.

8. The assembly of claim 1, wherein the inserts each include at least one bore therein.

9. The assembly of claim 8, wherein the wheel rim includes a plurality of apertures in the wheel rim corresponding to the locations of the at least one bore of the inserts.

10. The assembly of claim 9 further comprising at least one sealing plate disposed over the plurality of apertures that seals the apertures.

11. The assembly of claim 9, wherein the apertures and/or the at least one bore includes a sealant disposed within the at least one bore or a counter-bore portion of the at least one bore.

12. The assembly of claim 8, wherein the at least one bore includes an enlarged diameter portion for receiving a head of a fastener therein.

13. The assembly of claim 1, wherein the wheel center includes a threaded portion, and the at least one fastener engages the threaded portion.

14. The assembly of claim 1, wherein the radially inner surface is defined by a first surface of the at least one first layer of material and the radially outer surface is defined by a second surface of the at least one second layer of material.

15. The assembly of claim 1, wherein the insert is disposed axially between an axially inner surface and an axially outer surface.

16. A composite wheel assembly comprising:
a composite wheel rim having a radially inner surface and a radially outer surface;
a plurality of attachment inserts disposed radially between the radially inner surface and the radially outer surface of the wheel rim;
a wheel center attached to the composite wheel rim, wherein at least one fastener engages at least a portion of the attachment insert and secures the wheel center to the composite wheel rim;
wherein the radially inner surface, the axially inner surface, and the axially outer surface are defined by at least one first layer of material.

17. A composite wheel assembly comprising:
a composite wheel rim having a radially inner surface and a radially outer surface;
a plurality of attachment inserts disposed radially between the radially inner surface and the radially outer surface of the wheel rim;
a wheel center attached to the composite wheel rim, wherein at least one fastener engages at least a portion of the attachment insert and secures the wheel center to the composite wheel rim;
wherein the insert is disposed axially between an axially inner surface and an axially outer surface;
wherein the radially inner surface, the axially inner surface, and the axially outer surface are defined by at least one first layer of material;
wherein the at least one first layer of material defines a radially outer volume, and the at least one fastener enters and exits the radially outer volume through the axially inner and outer surfaces, and at least one second layer of material is disposed radially between the at least one fastener and a sealed volume of a tire when a tire is installed on the wheel rim.

18. A composite wheel apparatus comprising:
a composite wheel rim having a radially inner surface and a radially outer surface extending between an axially inner end and an axially outer end;
at least one first layer of composite material defining the radially inner surface;
at least one second layer of composite material defining the radially outer surface; and
a plurality of attachment inserts spaced apart circumferentially and disposed radially between the at least one first layer of material and the at least one second layer of material, and further disposed axially closer to the axially outer end than the axially inner end, wherein the inserts are configured to support a wheel center attached to the composite wheel rim.

19. The apparatus of claim 18, wherein the inserts define at least one bore extending therethrough for receiving a fastener, where an axis of the bore enters and exits an outer volume defined by the at least one first layer.

20. The apparatus of claim 19, wherein the inserts are sealed by the at least one second layer from a tire sealed volume defined by a radially outer surface of the at least one second layer.

21. The apparatus of claim 18, wherein the wheel rim includes a revolute inner surface at an axial location corresponding to an axial location of the inserts.

22. The apparatus of claim 18, wherein the wheel rim includes a non-revolute inner surface at an axial location corresponding to an axial location of the inserts.

23. The apparatus of claim 22, wherein the at least one first layer of material defines a plurality of pockets in which the inserts are disposed.

24. A wheel assembly comprising:
a composite wheel rim having a radially outer surface and a radially inner surface;
a plurality of circumferentially disposed inserts disposed radially between a first ply stack and a second ply stack, wherein the first ply stack is disposed radially inward relative to the second ply stack;
wherein each of the inserts includes a bore extending therethrough, wherein an axis of the bore enters and exits a radially outer volume defined by the first ply stack.

25. The assembly of claim 24 further comprising a wheel center attached to the wheel rim wherein fasteners extend at least partially through the bore of the inserts and secure the wheel center to the wheel rim.

26. The assembly of claim 24, wherein a radially inner surface of the first ply stack at an axial location corresponding to the inserts defines a revolute inner surface.

27. The assembly of claim 24, wherein a radially inner surface of the first ply stack at an axial location corresponding to the inserts defines a non-revolute inner surface.

* * * * *